United States Patent
Kim et al.

(10) Patent No.: US 10,378,943 B2
(45) Date of Patent: Aug. 13, 2019

(54) VEHICLE CONTROL DEVICE MOUNTED ON VEHICLE AND METHOD FOR CONTROLLING THE VEHICLE

(71) Applicant: LG ELECTRONICS INC., Seoul (KR)

(72) Inventors: Daebum Kim, Seoul (KR); Sangmin Park, Seoul (KR); Jonghwa Yoon, Seoul (KR); Chaehwan Leem, Seoul (KR)

(73) Assignee: LG Electronics Inc., Seoul (KR)

( * ) Notice: Subject to any disclaimer, the term of this patent is extended or adjusted under 35 U.S.C. 154(b) by 9 days.

(21) Appl. No.: 15/648,051

(22) Filed: Jul. 12, 2017

(65) Prior Publication Data
US 2018/0106654 A1    Apr. 19, 2018

(30) Foreign Application Priority Data
Oct. 14, 2016   (KR) .................. 10-2016-0133711

(51) Int. Cl.
*G01F 9/02*    (2006.01)
*B60R 16/023*    (2006.01)
(Continued)

(52) U.S. Cl.
CPC .......... *G01F 9/023* (2013.01); *B60R 16/0231* (2013.01); *B60W 30/00* (2013.01); *G05D 1/0011* (2013.01); *G05D 1/0225* (2013.01)

(58) Field of Classification Search
CPC .... G01F 9/023; G05D 1/0225; G05D 1/0011; B60R 16/0231
(Continued)

(56) References Cited

U.S. PATENT DOCUMENTS

2014/0305545 A1*  10/2014  Butler, Jr. ............ B67D 7/0401
                                                                     141/94
2014/0336935 A1*  11/2014  Zhu ........................ G01W 1/00
                                                                     702/3
(Continued)

FOREIGN PATENT DOCUMENTS

JP    2006168509        6/2006
JP    2006168509  A     6/2006
(Continued)

OTHER PUBLICATIONS

Korean Office Action, Transmission No. 9-5-2017-055989662, dated Aug. 10, 2017, 16 pages.
(Continued)

*Primary Examiner* — Redhwan K Mawari
*Assistant Examiner* — Rodney P King
(74) *Attorney, Agent, or Firm* — Fish & Richardson P.C.

(57) ABSTRACT

A vehicle control device for a vehicle includes a communication unit configured to communicate with a communication device located at a gas station, and a processor configured to control the vehicle to perform at least one of autonomous driving or autonomous fueling based on information received from the communication device. In addition, a control method for controlling a vehicle includes communicating with a communication device located at a gas station, and controlling a vehicle to perform an operation based on information received from the communication device.

19 Claims, 16 Drawing Sheets

(51) Int. Cl.
*G05D 1/00* (2006.01)
*G05D 1/02* (2006.01)
*B60W 30/00* (2006.01)

(58) Field of Classification Search
USPC .......................................................... 701/123
See application file for complete search history.

(56) References Cited

U.S. PATENT DOCUMENTS

| | | | |
|---|---|---|---|
| 2015/0198952 A1* | 7/2015 | Einecke | G05D 1/0225 134/6 |
| 2015/0346718 A1* | 12/2015 | Stenneth | G06Q 30/0611 701/2 |
| 2015/0348335 A1* | 12/2015 | Ramanujam | G07C 5/006 701/23 |

FOREIGN PATENT DOCUMENTS

| | | |
|---|---|---|
| JP | 2007233771 | 9/2007 |
| JP | 2007233771 A | 9/2007 |
| JP | 2013185854 | 9/2013 |
| JP | 2013185854 A | 9/2013 |
| JP | 2014003868 | 1/2014 |
| JP | 2014003868 A | 1/2014 |
| KR | 10-2012-0081051 | 7/2012 |
| KR | 20120081051 A | 7/2012 |
| KR | 1020120081051 | 7/2012 |
| KR | 10-2013-0131427 | 12/2013 |
| KR | 20130131427 A | 12/2013 |
| KR | 1020130131427 | 12/2013 |
| KR | 20140073131 A | 6/2014 |
| KR | 1020140073131 | 6/2014 |
| KR | 10-2015-0122301 | 11/2015 |
| KR | 20150122301 A | 11/2015 |
| KR | 1020150122301 | 11/2015 |
| KR | 10-2016-0015028 | 2/2016 |
| KR | 20160015028 A | 2/2016 |
| KR | 1020160015028 | 2/2016 |

OTHER PUBLICATIONS

Korean Notice of Allowance, Transmission No. 9-5-2018-013816497, dated Feb. 27, 2018, 6 pages.
International Search Report and Written Opinion in International Application No. PCT/KR2017/007780, dated Nov. 29, 2017, 18 pages (with English translation).

* cited by examiner (a)

(b)

(a)

(b)   (c)

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119(a), this application claims the benefit of an earlier filing date of and the right of priority to Korean Application No. 10-2016-0133711, filed on Oct. 14, 2016, the content of which is incorporated by reference herein in its entirety.

FIELD

The present disclosure relates to a vehicle control device provided in a vehicle and a control method of the vehicle.

BACKGROUND

A vehicle is an apparatus capable of moving a user who is riding in the user-desired direction, and a representative example may be a car. For convenience for using a vehicle, various types of sensors and electronic devices may be provided in the vehicle. For example, Advanced Driver Assistance System (ADAS) is being developed. An autonomous driving vehicle is also actively under development.

While development of the advanced driving assist system (ADAS) is actively undergoing in recent time, development of a technology for optimizing user's convenience and safety is required.

As part of this, the necessity of technology development on autonomous fueling for allowing a vehicle to autonomously fill fuel when the vehicle performs fueling has increased.

SUMMARY

An object of the present disclosure is to provide a vehicle control device and a control method of the vehicle capable of performing autonomous fueling in an optimized method.

Another object of the present disclosure is to provide a vehicle control device and a control method of the vehicle capable of performing autonomous fueling through autonomous driving within a gas station.

Another object of the present disclosure is to provide an optimized User Interface/User Experience (UI/UX) associated with optimized autonomous fueling for a user when performing autonomous fueling.

According to one aspect of the subject matter described in this application, a vehicle control device for a vehicle includes a communication unit configured to communicate with a communication device located at a gas station, and a processor configured to control the vehicle to perform at least one of autonomous driving or autonomous fueling based on information received from the communication device.

Implementations according to this aspect may include one or more of following features. The vehicle control device may further include a display unit. The processor may be configured to, based on the vehicle entering a region communicable with the communication device, receive information from the communication device and transmit the received information to the display unit, the information being an inquiry on whether or not to perform autonomous driving within the gas station. The processor may also be configured to transmit a control signal for operating the vehicle to the communication device based on an autonomous driving mode being selected through the display unit.

In some implementations, the processor may be configured to transmit one of a first screen information for selecting a fueling amount or a fueling cost or a second screen information for selecting a fueling position within the gas station that is displayed on the display unit based on an autonomous fueling mode being selected through the display unit. The processor may also be configured to transmit the control signal for operating the vehicle to the communication device based on a completion of payment for the selected fueling amount or the fueling cost.

In some implementations, the processor may be configured to allow the vehicle to perform autonomous driving within the gas station based on a control command received from the communication device. In some examples, the processor may be configured to, based on the vehicle starting autonomous driving, cause to be displayed on the display unit a route information that the vehicle will follow during autonomous driving within the gas station. The processor may be configured to, based on the vehicle arriving at a fueling position within the gas station, control the vehicle to open or close a fueling port of the vehicle according to information received from the communication device.

In some implementations, the processor may be configured to cause to be displayed on the display unit a screen information of a service that can be selected via a display unit and carried out during fueling according to information received from the communication device. In some examples, the screen information may be displayed on the display unit based on a fueling time exceeding a predetermined period of time for a completion of fueling.

In some implementations, the processor may be configured to, based on no fueling space being available in the gas station, cause to be displayed on the display unit a screen information of at least one of a waiting time or an available service during the waiting according to information received from the communication device.

In some implementations, the processor may be configured to, based on completion of fueling, control the vehicle to move to a predetermined region of the gas station according to a control command received from the communication device. In some examples, the processor may further be configured to, based on the vehicle being stopped at the predetermined region of the gas station, receive a control signal for operating the vehicle from the communication device. The control signal may be transmitted to the vehicle from the communication device based on a required payment being completed.

In some implementations, the processor may be configured to, based on the control signal being received, (i) cause to be displayed on the display unit a screen information indicating that a manual operation of the vehicle is allowed and (ii) control the vehicle according to a user's driving operation.

In some implementations, the vehicle control device may further Includes at least one of a camera or a sensing unit. In some examples, the processor may be configured to generate a first control command that allows the vehicle to perform autonomous driving within the gas station based on information received from at least one of the camera or the sensing unit. A server associated with the gas station may be configured to generate a second control command that is communicated through the communication device, and the processor may be configured to allow the vehicle to perform autonomous driving based on at least one of the first control command or the second control command.

In some implementations, the processor may be configured to (i) allow the vehicle to perform autonomous fueling based on the second control command received from the communication device and (ii) control the vehicle according to the first control command based on the first control command being different from the second control command.

In another aspect of the subject matter described in this application, a vehicle includes the vehicle control device described above.

In another aspect of the subject matter described in this application, a control method for controlling a vehicle includes: communicating with a communication device located at a gas station; and controlling a vehicle to perform an operation based on information received from the communication device.

Implementations according to this aspect may further include one or more of following features. The control method may further includes: displaying an information on a display unit of the vehicle, the information being an inquiry of whether or not to perform autonomous driving within the gas station based on the vehicle entering a region communicable with the communication device; transmitting a control signal for operating the vehicle to the communication device based on an autonomous driving mode being selected through the display unit; and allowing the vehicle to perform autonomous driving within the gas station based on a control command received from the communication device.

DETAILED DESCRIPTION

Figure 1:
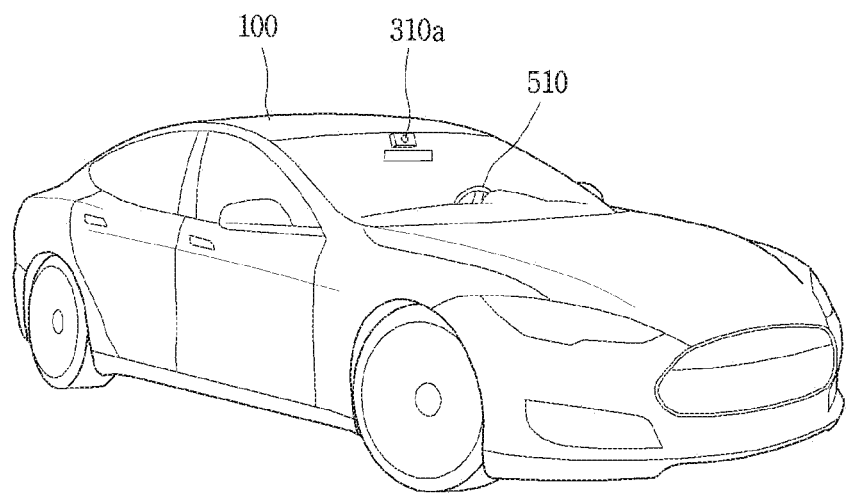
FIG. 1 is a perspective view of an external appearance of an example vehicle.
Figure 1:
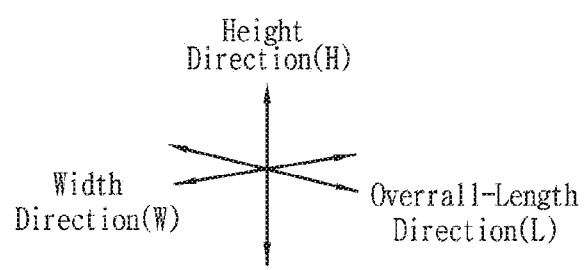

References will now be made in detail to examples illustrated in the accompanying drawings. Use of the same reference numerals in the drawings denote like elements, and repeated explanations thereof may not be given.

A vehicle, as described below, may include cars, motorcycles, or the like. Hereinafter, the vehicle will be described based on a car.

Additionally, the vehicle may refer to all of an internal combustion engine car having an engine as a power source, a hybrid vehicle having an engine and an electric motor as power sources, an electric vehicle having an electric motor as a power source, or the like.

Figure 2:
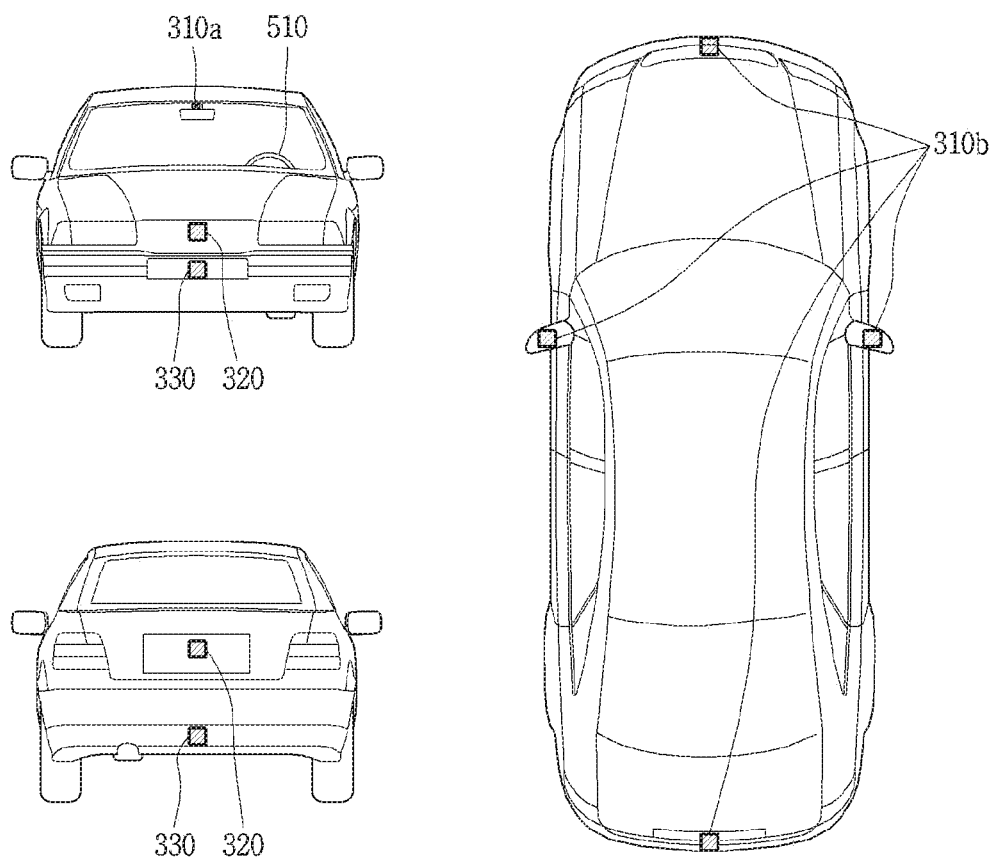
FIG. 2 is a view of an example vehicle at various angles.
Figure 3:
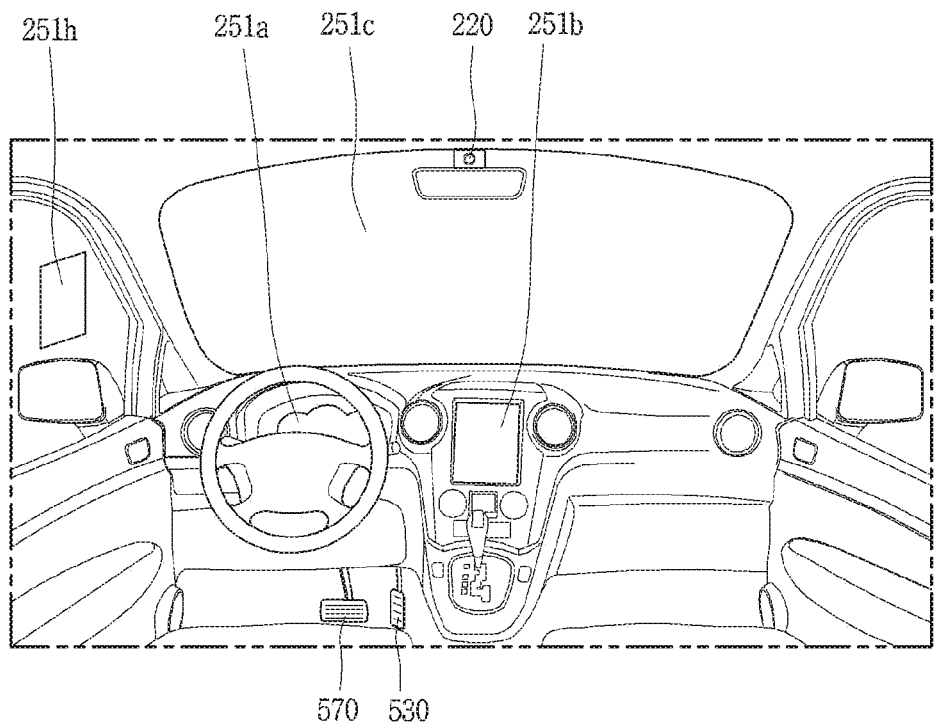
FIGS. 3 and 4 are views of an inside of an example vehicle.
Figure 4:
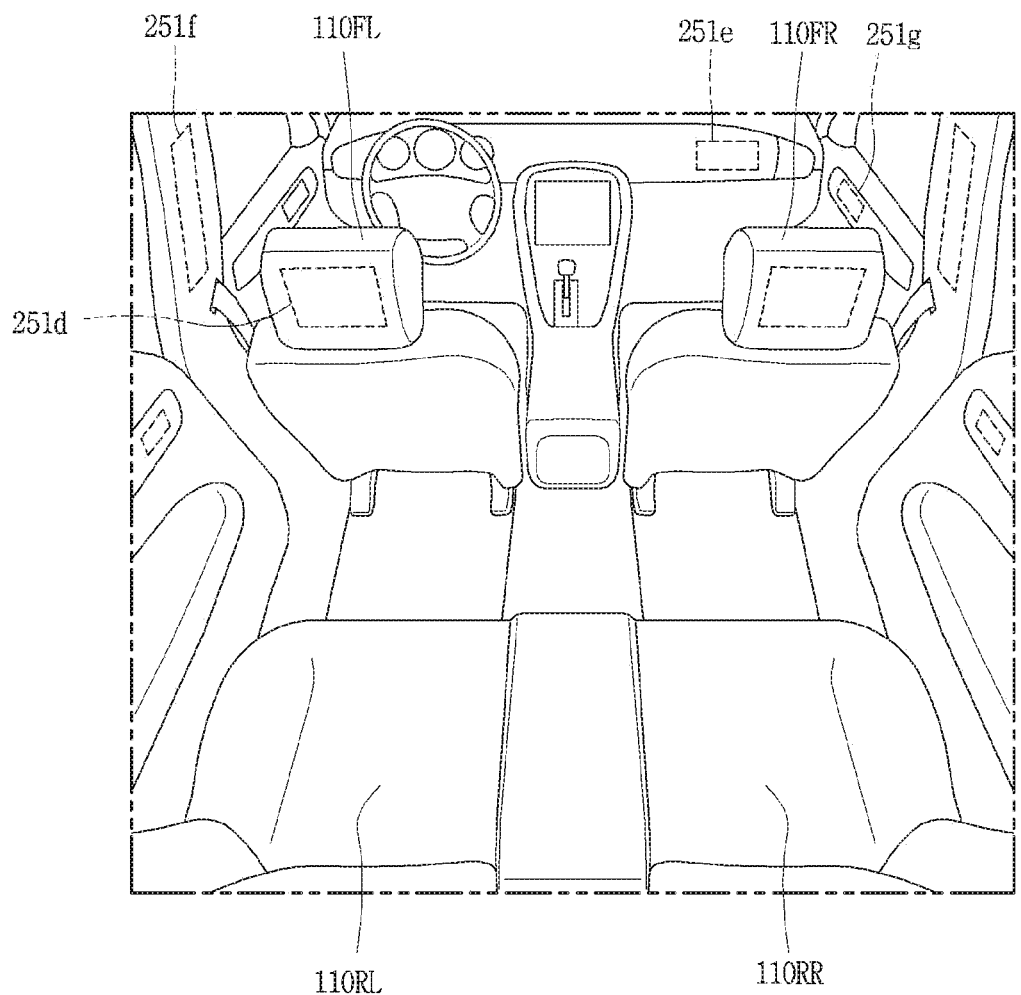
Figure 5:
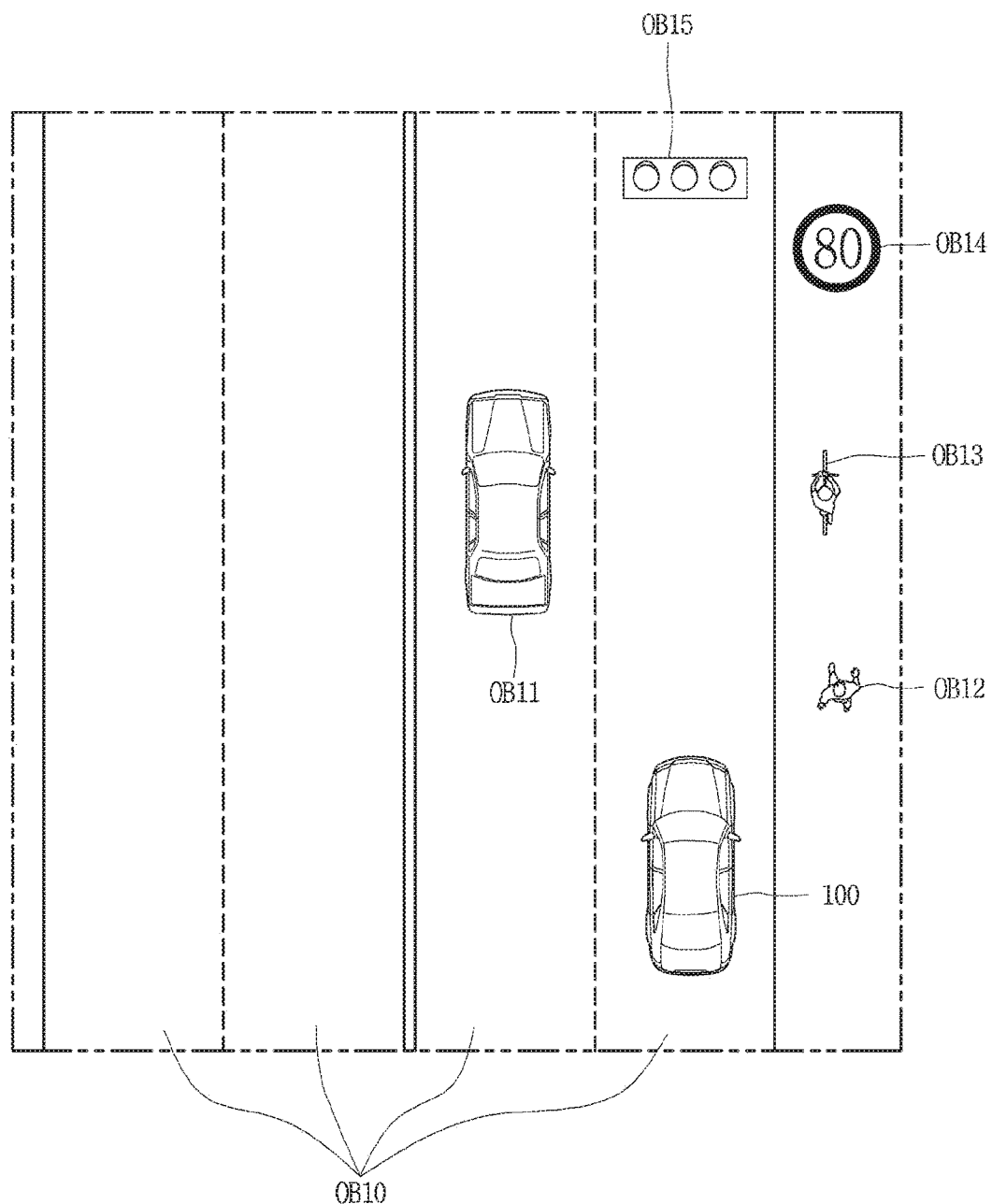
FIGS. 5 and 6 are views of example objects around the vehicle.
Figure 6:
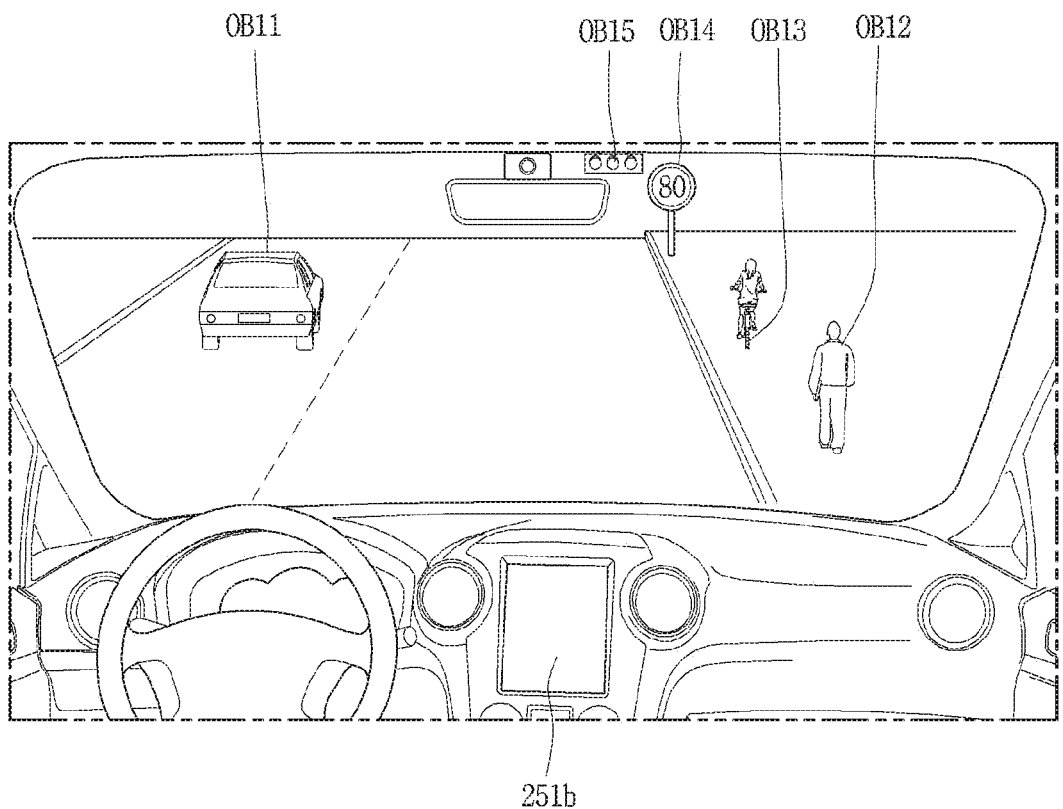
Figure 7:
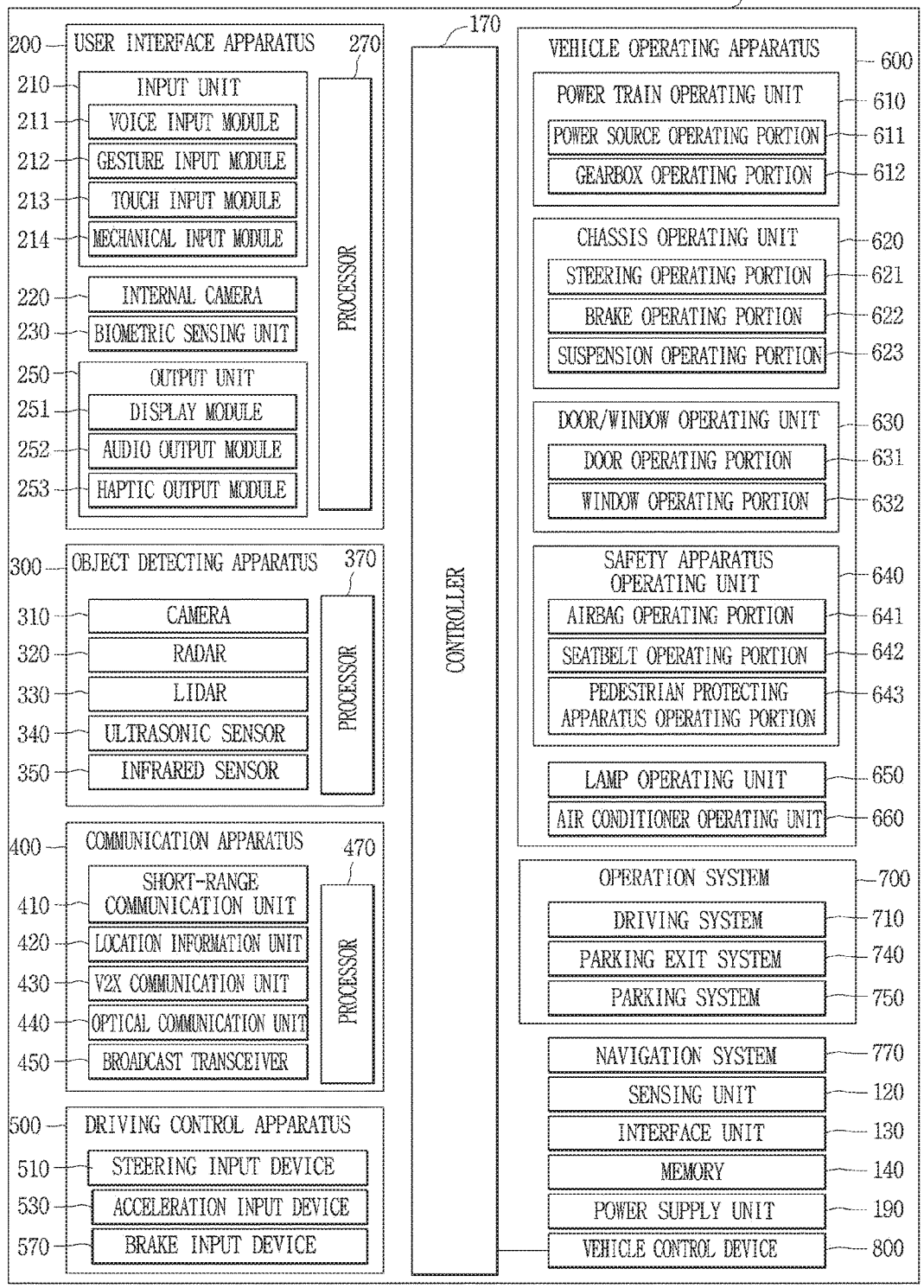
FIG. 7 is a block diagram of an example vehicle.

FIG. 1 illustrates an example vehicle 100.
FIG. 2 illustrates an example vehicle at various angles.
FIGS. 3 and 4 illustrate an inside of an example vehicle.
FIGS. 5 and 6 illustrate outside objects of an example vehicle.
FIG. 7 is a block diagram of an example vehicle 100.

As illustrated in FIGS. 1-7, a vehicle 100 may include wheels turned by a driving force and a steering apparatus 510 for adjusting a driving direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200. The vehicle 100 may be switched into the autonomous mode or the manual mode based on driving environment information. The driving environment information may be generated based on object information provided from an object detecting apparatus 300. The vehicle 100 may be switched from the manual mode into the autonomous mode or from the autonomous module into the manual mode based on driving environment information generated in the object detecting apparatus 300.

The vehicle 100 may be switched from the manual mode into the autonomous mode or from the autonomous module into the manual mode based on driving environment information received through a communication apparatus 400. The vehicle 100 may be switched from the manual mode into the autonomous mode or from the autonomous mode into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data, or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a reference for measuring the overall length of the vehicle 100, a width direction W may refer to a direction that is a reference for measuring a width of the vehicle 100, and a height direction H may refer to a direction that is a reference for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170, and a power supply unit 190.

In some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may include user interfaces (UIs) or user experiences (UXs) implemented through the user interface apparatus 200.

The user interface apparatus 200 may include an input unit 210, an internal camera 220, a biometric sensing unit 230, an output unit 250 and a processor 270.

In some implementations, the user interface apparatus 200 may include more components in addition to components to be explained in this specification or may not include some of those components to be explained in this specification.

The input unit 210 may allow the user to input information. Data collected in the input unit 210 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The voice input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

In some implementations, the gesture input module 212 may detect a user's three-dimensional (3D) gesture input. The gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170. The touch input module 213 may include a touch sensor for detecting the user's touch input. In some implementations, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel, or a jog switch. An electric signal generated by the mechanical input module 214 may be provided to the processor 270 or the controller 170. The mechanical input module 214 may be arranged on a steering wheel, a center fascia, a center console, a cockpit module, a door or the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal. The output unit 250 may include at least one of a display module 251, an audio output module 252 and a haptic output module 253.

The display module 251 may output graphic objects corresponding to various types of information. The display module 251 may include at least one of a liquid crystal display (LCD), a thin film transistor-LCD (TFT LCD), an organic light-emitting diode (OLED), a flexible display, a three-dimensional (3D) display, or an e-ink display. The display module 251 may be inter-layered or integrated with a touch input module 213 to implement a touch screen. The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window. The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

The user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. The audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200. In some implementations, the user interface apparatus 200 may include a plurality of processors 270 or may not include any processor 270. When the processor 270 is not included in the user interface apparatus 200, the user interface apparatus 200 may operate according to a control of a processor of another apparatus within the vehicle 100 or the controller 170.

The user interface apparatus 200 may be called as a display apparatus of the vehicle. The user interface apparatus 200 may operate according to the control of the controller 170.

The object detecting apparatus 300 is an apparatus for detecting an object located at outside of the vehicle 100. The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The vehicle OB11 may be another vehicle around the vehicle 100. The vehicle OB11 may be located within a predetermined distance from the vehicle 100. For example, the vehicle OB11 may be another vehicle which moves ahead or behind the vehicle 100.

The pedestrian OB12 may be a person located near the vehicle 100. The pedestrian OB12 may be located within a predetermined distance from the vehicle 100. For example, the pedestrian OB12 may be a person located on a sidewalk or roadway.

The two-wheeled vehicle OB13 may refer to a vehicle that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

Traffic signals may include a traffic light OB15, a traffic sign OB14 and a pattern or text drawn on a road surface.

Light may be emitted from another vehicle, a streetlamp, or the sun.

The road may include a road surface, a curve, an upward slope, a downward slope, or the like.

The structure may be an object that is located near a road and fixed on the ground. For example, the structure may include a streetlamp, a roadside tree, a building, an electric pole, a traffic light, a bridge, or the like.

The geographical feature may include a mountain, a hill and the like.

The objects may be classified into a moving object and a fixed object. For example, the moving object may include another vehicle and a pedestrian. The fixed object may include a traffic signal, a road, and a fixed structure outside the vehicle.

The object detecting apparatus 300 may include a camera 310, a radar 320, a LiDAR 330, an ultrasonic sensor 340, an infrared sensor 350 and a processor 370. In some implementations, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310*a*, an around view monitoring (AVM) camera 310*b* or a 360-degree camera. For example, the camera 310 may be disposed adjacent to a front windshield within the vehicle to acquire a front image of the vehicle. In some implementations, the camera 310 may be disposed adjacent to a front bumper or a radiator grill. For example, the camera 310 may be disposed adjacent to a rear glass within the vehicle to acquire a rear image of the vehicle. In some implementations, the camera 310 may be disposed adjacent to a rear bumper, a trunk or a tail gate. For example, the camera 310 may be disposed adjacent to at least one of side windows within the vehicle to acquire a side image of the vehicle. In some implementation, the camera 310 may be disposed adjacent to a side mirror, a fender or a door. The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift keying (FSK) manner according to a signal waveform, among the continuous wave radar methods. The radar 320 may detect an object in a time of flight (TOF) manner or a phase-shift manner through the medium of the electric wave, and detect a position of the detected object, a distance from the detected object and a relative speed with the detected object. The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner. The LiDAR 330 may be implemented as a drive type or a non-drive type.

The drive type LiDAR 330 may be rotated by a motor and detect object near the vehicle 100. The non-drive type LiDAR 330 may detect, through light steering, objects which are located within a predetermined range based on the vehicle 100. The vehicle 100 may include a plurality of the non-drive type LiDAR 330.

The LiDAR 330 may detect an object by TOF or a phase-shift through the medium of a laser beam and determine a position of the detected object, a distance from the detected object, and a relative speed with the detected object. The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and determine a position of the detected object, a distance from the detected object, and a relative speed with the detected object. The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 350 may detect an object based on infrared light and determine a position of the detected object, a distance from the detected object and a relative speed with the detected object. The infrared sensor 350 may be disposed on an appropriate position outside the vehicle for detecting an object located at the front, rear or side of the vehicle.

The processor 370 may control an overall operation of each unit of the object detecting apparatus 300. The processor 370 may detect an object based on an acquired image, and track the object. The processor 370 may execute operations, such as a calculation of a distance from the object, a calculation of a relative speed with the object and the like, through an image processing algorithm. The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave. The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam. The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave. The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

In some implementations, the object detecting apparatus 300 may include a plurality of processors 370 or may not include any processor 370. For example, each of the camera 310, the radar 320, the LiDAR 330, the ultrasonic sensor 340, and the infrared sensor 350 may include its own processor.

When the processor 370 is not included in the object detecting apparatus 300, the object detecting apparatus 300 may operate according to the control of a processor of an apparatus within the vehicle 100 or the controller 170. The object detecting apparatus 300 may operate according to the control of the controller 170.

The communication apparatus 400 is an apparatus for performing communication with an external device. Here, the external device may be another vehicle, a mobile terminal, or a server. The communication apparatus 400 may perform the communication by including at least one of a transmitting antenna, a receiving antenna, and radio frequency (RF) circuit and RF device for implementing various communication protocols. The communication apparatus 400 may include a short-range communication unit 410, a location information unit 420, a V2X communication unit 430, an optical communication unit 440, a broadcast transceiver 450 and a processor 470. In some implementations, the communication apparatus 400 may further include other components in addition to the components described above, or may not include some of the components.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal. In some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400. In some implementations, the communication apparatus 400 may include a plurality of processors 470 or may not include any processor 470. When the processor 470 is not included in the communication apparatus 400, the communication apparatus 400 may operate according to the control of a processor of another device within the vehicle 100 or the controller 170. The communication apparatus 400 and the user interface apparatus 200 may include a common display apparatus of the vehicle, where the display apparatus for the vehicle may be referred to a telematics apparatus or an Audio Video Navigation (AVN) apparatus. The communication apparatus 400 may operate according to the control of the controller 170.

The driving control apparatus 500 is an apparatus for receiving a user input for driving. In a manual mode, the vehicle 100 may be operated based on a signal provided by the driving control apparatus 500. The driving control apparatus 500 may include a steering input device 510, an acceleration input device 530 and a brake input device 570.

The steering input device 510 may receive an input regarding a driving direction of the vehicle 100 from the user. The steering input device 510 may be configured in the form of a wheel allowing a steering input in a rotating manner. In some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Both the acceleration input device 530 and the brake input device 570 may be configured in the form of a pedal. In some implementations, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100. The vehicle operating apparatus 600 may include a power train operating unit 610, a chassis operating unit 620, a door/window operating unit 630, a safety apparatus operating unit 640, a lamp operating unit 650, and an air-conditioner operating unit 660. In some implementations, the vehicle operating apparatus 600 may further include other components in addition to the components described, or may not include some of the components described. The vehicle operating apparatus 600 may include a processor. Each unit of the vehicle operating apparatus 600 may individually include a processor.

The power train operating unit 610 may control an operation of a power train device. The power train operating unit 610 may include a power source operating portion 611 and a gearbox operating portion 612.

The power source operating portion 611 may perform a control for a power source of the vehicle 100. For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox. The gearbox operating portion 612 may adjust a state of the gearbox. The gearbox operating portion 612 may change the state of the gearbox into drive (forward) (D), reverse (R), neutral (N) or parking (P). When an engine is the power source, the gearbox operating portion 612 may adjust a locked state of a gear in the drive (D) state.

The chassis operating unit 620 may control an operation of a chassis device. The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100. The brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road. The suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100. The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor. The vehicle operating apparatus 600 may operate according to the control of the controller 170.

The operation system 700 is a system that controls various driving modes of the vehicle 100. The operation system 700 may include a driving system 710, a parking exit system 740 and a parking system 750. In some implementations, the operation system 700 may further include other components in addition to components to be described, or may not include some of the components to be described.

The operation system 700 may include a processor. Each unit of the operation system 700 may individually include a processor. In some implementations, the operation system 700 may be a sub system of the controller 170 when it is implemented as a software.

In some implementations, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100. The driving system 710 may receive navigation information from a navigation system 770, transmit a control signal to the vehicle operating apparatus 600, and perform driving of the vehicle 100. The driving system 710 may receive object information from the object detecting apparatus 300, transmit a control signal to the vehicle operating apparatus 600 and perform driving of the vehicle 100. The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot. The parking exit system 740 may receive navigation information from the navigation system 770, transmit a control signal to the vehicle operating apparatus 600, and perform the exit of the vehicle 100 from the parking lot. The parking exit system 740 may receive object information from the object detecting apparatus 300, transmit a control signal to the vehicle operating apparatus 600, and perform the exit of the vehicle 100 from the parking lot. The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100. The parking system 750 may receive navigation information from the navigation system 770, transmit a control signal to the vehicle operating apparatus 600, and park the vehicle 100. The parking system 750 may receive object information from the object detecting apparatus 300, transmit a control signal to the vehicle operating apparatus 600, and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

In some implementations, the navigation system 770 may update prestored information by receiving information from an external device through the communication apparatus 400. In some implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal, and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this case, the interface unit 130 may exchange data with the mobile terminal.

The interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

In some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, or the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 100 according to the present disclosure may include a vehicle control device 800.

The vehicle control device 800 may control at least one of those components illustrated in FIG. 7. From this perspective view, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions, operations, and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of components included in an example vehicle control device 800.

Figure 8:
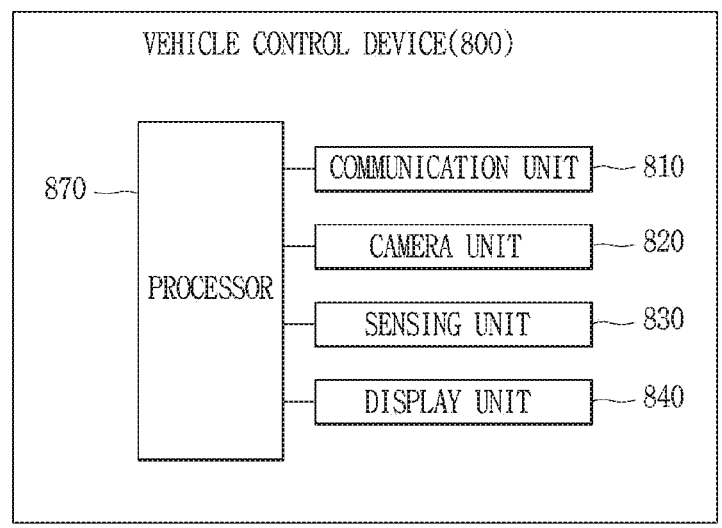
FIG. 8 is a conceptual view of an example vehicle control device.

FIG. 8 is a conceptual view of an example vehicle control device according.

The vehicle control device 800 associated with the present disclosure may include a communication unit 810, a camera 820, a sensing unit 830, a display unit 840, a processor 870, and the like.

The communication unit 810 may be the foregoing communication apparatus 400. The communication unit 810 may be connected to the device in a wireless manner to enable wireless communication with a communicable device existing outside.

For example, the communication unit 810 may be connected to a communication device existing in a gas station (or electric charging station) to enable communication.

For example, the communication unit 810 may be connected to the communication device to enable communication by the control of the processor 870 (or controller 170) when enters a region communicable with the communication device existing in a gas station When a signal for connecting communication transmitted from the communication device is received as enters a region communicable with the communication device existing in a gas station, the processor 870 may be connected to the communication device in a communicable manner in response to the received signal.

The communication device existing in the gas station may periodically (or at specific times or always) transmit a signal for connecting communication with a vehicle entering a gas station or transmit the signal based on that the vehicle 100 enters a region (or gas station) communicable with the communication device.

The communication unit 810 connected to enable communication and the communication device existing in a gas station may transmit and receive mutual data, information, control authority, a control command, a control signal and the like to and from each other.

The communication unit 810 may be provided within a vehicle (or within a vehicle control device), or provided at an outside of the vehicle, or formed in the form of an additional module and formed to enable communication (or electrical coupling) with a constituent element of the vehicle.

The camera 820 may be formed to capture the surrounding of the vehicle. The camera 820 may be the camera 310 included in the object detecting apparatus 300.

The processor 870 may generate a control command capable of allowing the vehicle 100 to perform autonomous driving or autonomous fueling based on an image (or preview image) received through the camera 820.

Specifically, the processor 870 may analyze an image received through the camera 820 to extract information required for autonomous driving such as an object existing around the vehicle, the surrounding environment of the vehicle, and the like, and generate a control command capable of allowing the vehicle to perform autonomous driving based on the extracted information.

In other words, information extracted from an image received through the camera 820 may be used for a preset algorithm for generating a control command capable of allowing the vehicle 100 to perform autonomous driving.

The sensing unit 830 included in the vehicle control device 800 associated with the present disclosure may be the object detecting apparatus 300 illustrated in FIG. 7 or the sensing unit 120 provided in the vehicle 100.

Furthermore, the sensing unit 830 may be an additional sensing unit that is independent from the object detecting apparatus 300 provided in the vehicle or the sensing unit 120 provided in the vehicle 100. Even when the sensing unit 830 is an independent sensing unit, the sensing unit 830 may include the characteristics of the sensing unit 120 or object detecting apparatus 300 illustrated in FIG. 7.

Furthermore, the sensing unit 830 may be implemented in combination with at least two of the camera 310, the radar 320, the LiDAR 330, the ultrasonic sensor 340, the infrared sensor, and the sensing unit 120.

The sensing unit 830 may sense information associated with the vehicle 100 of the present disclosure.

The information associated with the vehicle may be at least one of vehicle information (or driving status of the vehicle) and surrounding information of the vehicle.

For example, the vehicle information may include a driving speed of the vehicle, a weight of the vehicle, a number of passengers in the vehicle, a braking force of the vehicle, a maximum braking force of the vehicle, a driving mode of the vehicle such as autonomous driving mode and manual driving mode, a parking mode of the vehicle such as autonomous parting mode, automatic parking mode, and manual parking mode, presence of a user in the vehicle, and information associated with the user, for example, whether the user is an authenticated user, and the like.

The surrounding information of the vehicle may be a state of road surface on which the vehicle is travelling, weather, a distance from a front-side (rear-side) vehicle, a relative speed of a front-side (rear-side) vehicle, a curvature of curve when a driving lane is the curve, an ambient brightness of the vehicle, information associated with an object existing in a reference region (predetermined region) based on the vehicle, whether or not an object enters (or leaves) the predetermined region, whether or not a user exists around the vehicle, and information associated with the user (for example, whether or not the user is an authenticated user), and the like.

Furthermore, the surrounding information (or surrounding environment information) of the vehicle may include external information of the vehicle (for example, ambient brightness, a temperature, a position of the sun, nearby subject (a person, another vehicle, a sign, etc.) information, a type of driving road surface, a landmark, line information, driving lane information), and information required for an autonomous driving/autonomous parking/automatic parking/manual parking mode.

Furthermore, the surrounding information of the vehicle may further include a distance from an object existing around the vehicle to the vehicle 100, a type of the object, a parking space for the vehicle, an object for identifying the parking space (for example, a parking line, a string, another vehicle, a wall, etc.), and the like.

Hereinafter, for the sake of convenience of explanation, a configuration in which the sensing unit 830 is additionally provided in the vehicle control device 800 will be described as an example. Allowing the processor 870 to acquire any information through the sensing unit 830 may be understood as allowing the processor 870 to acquire any information using at least one of the object detecting apparatus 300 and the sensing unit 120 provided in the vehicle 100.

The processor 870 may generate a control command capable of allowing the vehicle 100 to perform autonomous driving or autonomous fueling based on information through the sensing unit 830.

Specifically, the processor 870 may analyze information received through the sensing unit 830 to extract information required for autonomous driving such as an object existing around the vehicle, the surrounding environment of the vehicle, and the like, and generate a control command capable of allowing the vehicle to perform autonomous driving based on the extracted information.

In other words, information sensed through the sensing unit 830 may be used for a preset algorithm for generating a control command capable of performing autonomous driving.

The display unit 840 included in the vehicle control device 800 associated with the present disclosure may be the foregoing display unit 251 as a display device provided within the vehicle 100.

Furthermore, the display unit 840 may include a touch screen of the mobile terminal connected to the vehicle control device 800 (or vehicle 100) to enable communication. The mobile terminal and the vehicle control device 800 may be connected to each other to enable wired/wireless communication through the communication unit 810 (or interface unit).

The processor 870 may control the touch screen of the mobile terminal through the communication unit.

The processor 870 may display various information on the display unit 840 based on information received through a communication device in a gas station. Various information (screen information, a user interface, a graphic object, an image, etc.) displayed on the display unit 840 will be described in more detail with reference to the accompanying drawings.

The vehicle control device 800 according to the present disclosure may include the processor 870 capable of controlling the communication unit 810, camera 820, sensing unit 830, display unit 840 and the like.

The processor 870 may be the controller 170 illustrated in FIG. 7.

The processor 870 may control constituent elements illustrated in FIG. 7 and constituent elements illustrated in FIG. 8.

The processor 870 included in the vehicle control device 800 associated with the present disclosure may control the vehicle 100 to perform an operation linked to information based on the information received from a communication device existing in a gas station.

Here, the information may denote information for controlling the vehicle 100. Furthermore, an operation (function) linked to the information may denote a specific operation (or specific function) linked to (included in) the relevant information among a plurality of operations (functions) capable of controlling the vehicle 100.

Figure 9:
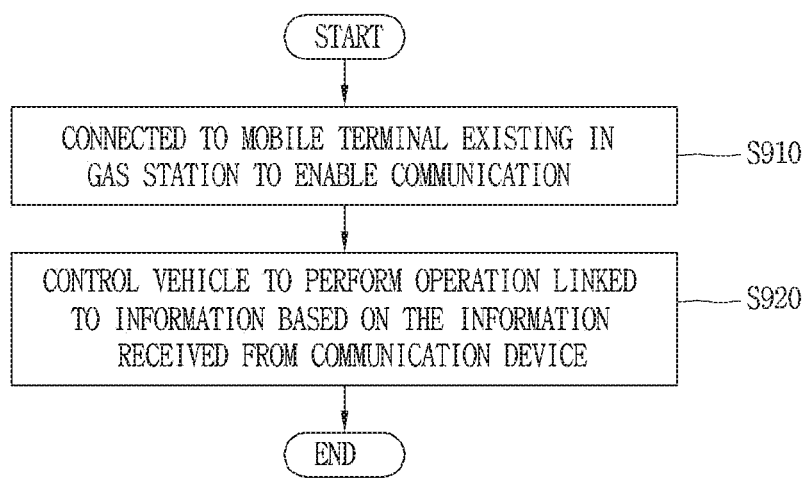
FIG. 9 is a flow chart of an example vehicle control method.

FIG. 9 is a flow chart for explaining an example control method. FIGS. 10, 11A, 11B, 11C, 12, 13, 14 and 15 are conceptual views for explaining the control method of FIG. 9 and various implementations of the present disclosure.

For the sake of convenience of explanation, a gas station in which the vehicle 100 uses a fuel such as gasoline will be described. However, the gas station may include all places capable of charging a fuel used in the vehicle, such as an electric charging station, a hydrogen charging station, a solar charging station, or the like.

Figure 10:
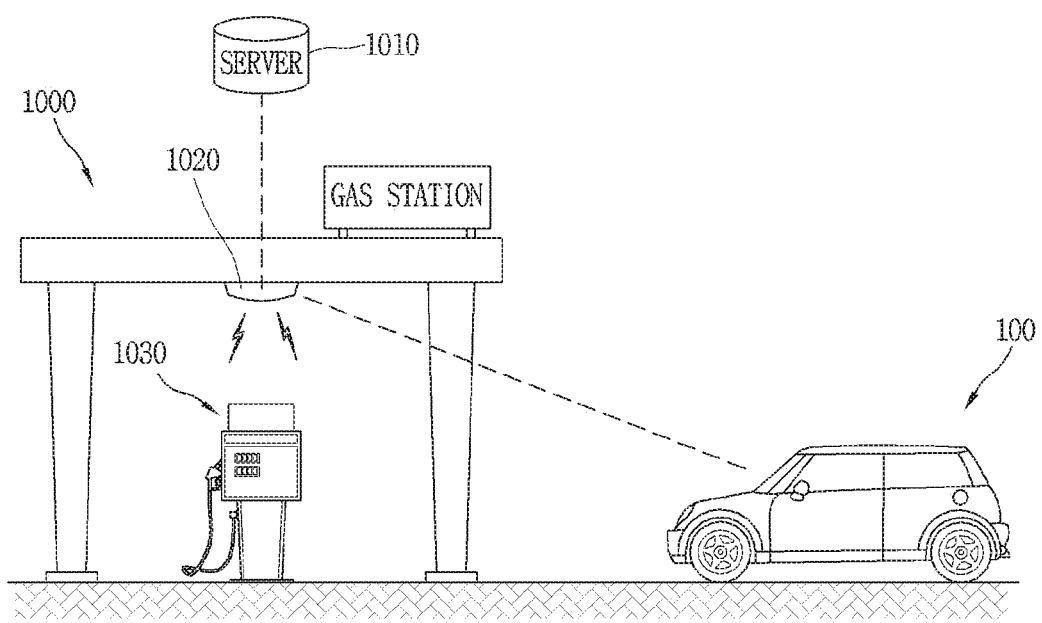
FIGS. 10, 11A, 11B, 11C, 12, 13, 14, and 15 are conceptual views illustrating the control method of FIG. 9.

Referring to FIG. 10, in some implementations, the vehicle 100 may perform autonomous driving without a user's driving operation within the gas station 1000 capable of charging a fuel of the vehicle 100. Here, the autonomous driving may be understood as a concept including autonomous fueling (or automatic fueling) or autonomous charging (or automatic charging) without any user's intervention.

An autonomous fueling for charging oil without any user's intervention will be described. However, the autonomous fueling should be understood as a concept of charging other types of fuels used in the vehicle 100 such as electricity, hydrogen, solar energy, or the like.

The gas station 1000 may include a server 1010 associated with the gas station, a communication device 1020 configured to transmit information (signals, control commands, control signals, data, etc.) generated from the server to the vehicle 100 (or mobile terminal), and a fuel dispenser (or a fueling device, a charger, a charging device 1030 configured to charge a fuel of the vehicle.

Furthermore, the gas station 1000 may further include a camera and a sensing unit, and the camera and sensing unit may include the characteristics of the camera 310 and sensing unit 120 illustrated in FIG. 7. An image received through the camera and information sensed through the sensing unit may be transmitted to the server 1010.

The server 1010 may be provided within the gas station 1000 or exist at an outside of the gas station 1000. The server 1010 may be connected to the communication device 1020 in a wired/wireless manner to enable communication, and transmit information including signals, control commands, data, and etc. to an external device such as the vehicle 100 and a mobile terminal entering the gas station 1000 through the communication device 1020.

The server 1010 may perform various functions associated with the gas station 1000. For example, the server 1010 may manage fuels stored (or available) in the gas station 1000. For example, the server 1010 may store and update a stock amount of fuel, an amount of fuel provided to the vehicle, a fuel unit price, and information associated with a fuel dispenser for injecting a fuel into the vehicle (for example, a fuel dispenser stock number, a fuel available amount per hour, a fuel dispenser supply replacement time, etc.).

Furthermore, the server 1010 may generate a control command capable of allowing (or controlling) the vehicle 100 entering the gas station 1000 to perform autonomous driving using at least one of the camera and the sensing unit provided in the gas station 1000.

The control command generated from the server 1010 may be transmitted to the vehicle control device 800 (or vehicle 100) through the communication device of the gas station, for instance.

In other words, the server 1010 may provide an autonomous fueling system using autonomous driving capable of allowing the vehicle 100 that has entered the gas station 1000 to perform autonomous driving or autonomous fueling using at least one of the camera and the sensing unit provided in the gas station.

The communication device 1020 may include the characteristics of a communication device provided in the present vehicle illustrated in FIG. 7. According to the present specification, the communication device 1020 and server 1010 with individual configurations have been described, but may not be necessarily limited to this. For example, the communication device 1020 may be the server 1010 provided with a communication function.

The communication device 1020 may be provided at one position of the gas station 1000 to perform communication with the vehicle 100 entering the gas station 1000.

The fuel dispenser 1030 may be implemented in various forms as a device capable of directly fueling or charging a fuel to the vehicle. The fuel dispenser 1030 may be formed to be communicable with at least one of the server 1010 and the vehicle 100. The fuel dispenser 1030 may set an amount of fuel to be injected into the relevant vehicle 100, and inject the fuel into the vehicle as much as that amount. The fuel dispenser 1030 may inject the fuel into the vehicle 100 by a user's manipulation, or inject the fuel into the vehicle 100 by itself without the user's manipulation.

For example, a fueling hose of the fuel dispenser 1030 and a dispenser handle may be controlled to insert the dispenser handle into a fueling port of the vehicle 100 and inject a fuel into the vehicle as much as the set amount of the fuel without any user's manipulation.

The technology of an automatic fuel dispenser for injecting a fuel into the vehicle by itself is a general technology, and thus the detailed description thereof will be omitted.

As described above, the gas station 1000 may control the vehicle entering the gas station 1000 to perform autonomous driving (or autonomous fueling).

Hereinafter, a vehicle control device for controlling a vehicle to perform autonomous driving, autonomous fueling, or both within the gas station 1000 and a control method of the vehicle including the same will be described in more detail.

Referring to FIG. 9, S910 is a process of connecting the vehicle 100 or vehicle control device 800 to the communication device 1020 in the gas station 1000 to enable communication.

Here, connecting the vehicle 100 or vehicle control device 800 to the communication device 1020 to enable communication may include the meaning of connecting the vehicle 100 or vehicle control device 800 to the server 1010 associated with a gas station to enable communication.

In other words, the server 1010 associated with a gas station and the vehicle 100 or vehicle control device 800 may communicate information such as signals, control commands, data, and etc. through the communication device 1020 in the gas station 1000.

The processor 870 may be connected to the communication device 1020 existing in the gas station 1000 to enable communication based on the satisfaction of a preset condition.

Figure 11A:
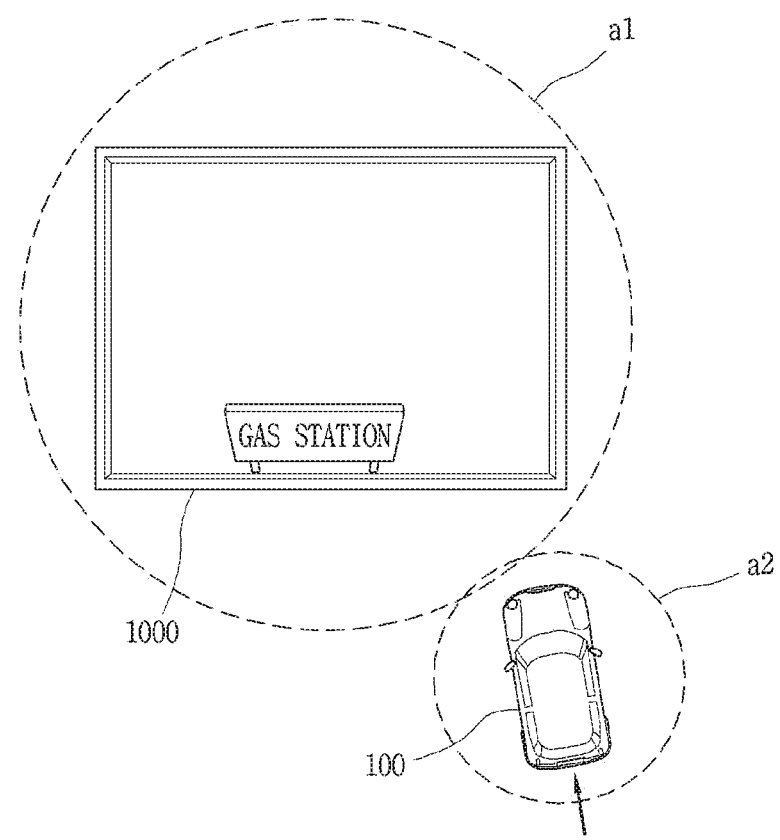

For example, as illustrated in FIG. 11A, when the vehicle 100 enters a region (a1, a2) that is communicable with the communication device 1020 provided in the gas station 1000, the processor 870 may receive a signal for connecting communication to the communication device 1020 through the communication unit 810.

In this case, the processor 870 may be connected to communication device 1020 to enable communication in response to the signal.

Here, the server 1010 of the gas station may sense the vehicle 100 entering a region (a1, a2) that is communicable with the communication device 1020 of the gas station 1000 through at least one of the camera and the sensing unit.

The server 1010 may transmit the signal to the vehicle 100 (or an outside) through the communication device 1020 based on the vehicle 100 entering the communicable region (a1, a2), and transmit the signal to the vehicle 100 (or an outside) through the communication device 1020 based on the vehicle 100 stopping at a specific region (a2) of the region (a1, a2) for more than a predetermined period of time.

Here, the predetermined period of time may denote a period of time during which the vehicle 100 should wait in the specific region (a2) to transmit the signal to the vehicle, and may be determined or changed by the user's setting.

For another example, the communication device 1020 (or server 1010) and the vehicle 100 (or vehicle control device 800) may be connected to communicate with each other based on a request of the user getting in the vehicle 100.

For example, when the vehicle 100 enters the gas station 1000 (or a user request is received), screen information for inquiring whether or not to perform communication connection with the communication device 1020 (or server 1010) provided in the relevant gas station 1000 may be displayed on the display unit 840 of the vehicle control device 800.

Then, when a communication connection is requested, the processor 870 may transmit a signal for communication connection with the communication device 1020 existing in the gas station 1000 through the communication unit 810.

S920 is a process of controlling the vehicle to perform an operation linked to information based on the information received from the communication device 1020.

When the communication device 1020 or server 1010 existing in the gas station 1000 and the vehicle control device 800 or vehicle 100 are connected, the vehicle 100 may operate by the control of the server 1010 connected to the communication device 1020. In other words, the server 1010 may control the vehicle 100 to allow the vehicle 100 to perform autonomous driving or autonomous fueling for the vehicle 100 entering the gas station 1000.

Information received from the communication device 1020 may be information generated from the server 1010 and transferred to the communication device 1020.

Furthermore, controlling the vehicle to perform an operation linked to the information based on the information may include allowing the vehicle 100 to perform autonomous driving (or autonomous fueling) within the gas station 1000 by the control of the server 1010 through the communication device 1020 and displaying screen information associated with information sensed from the server 1010 on the display unit 840 of the vehicle.

Figure 11B:
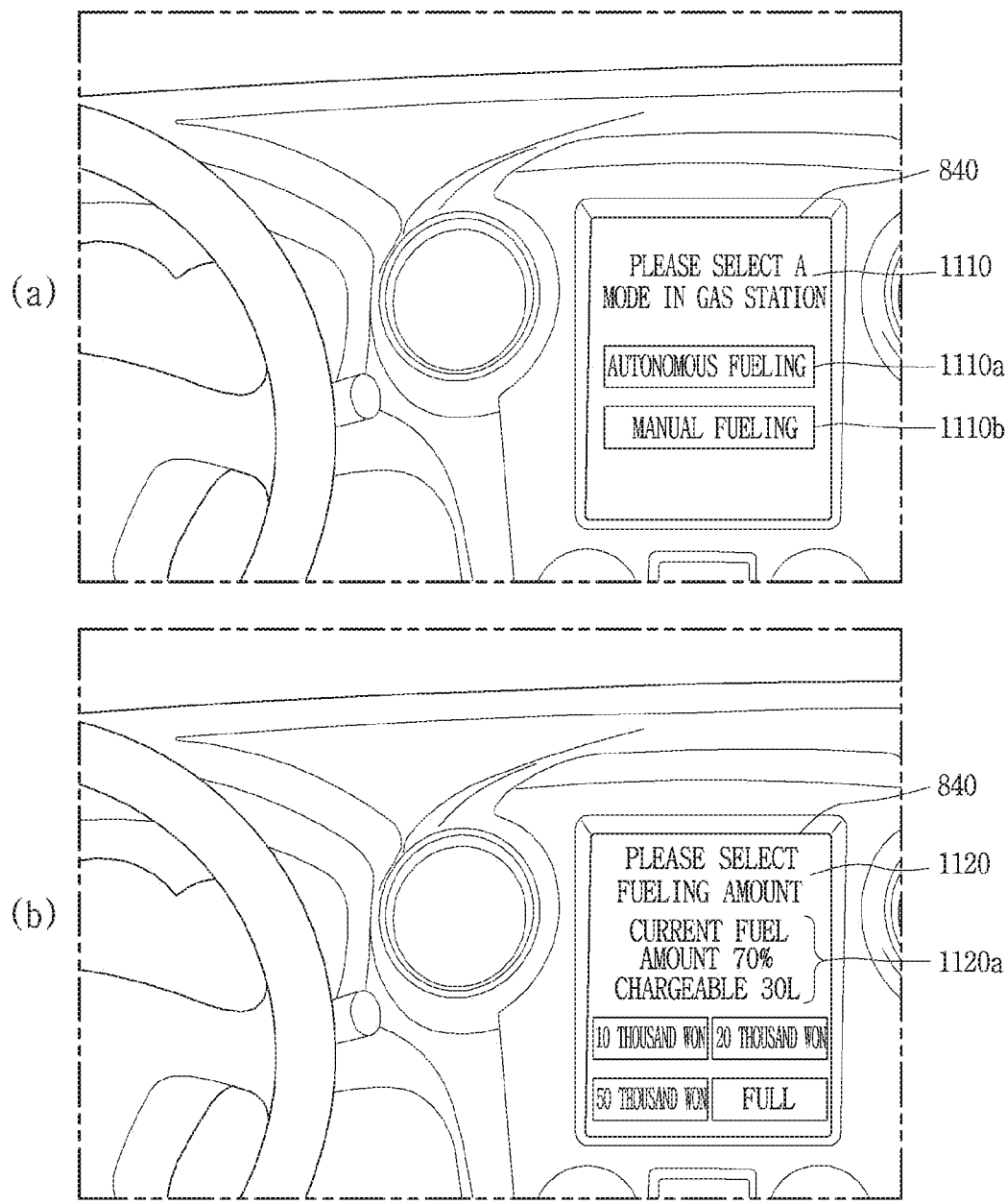

For example, the vehicle control device 800 may include the display unit 840 provided in the vehicle as illustrated in FIG. 11B(a).

When the vehicle 100 enters a region (a1 or a2) that is communicable with the communication device 1020, the processor 870 may receive information 1110 for inquiring whether or not perform autonomous driving (or autonomous fueling) within the gas station 1000 from the communication device 1020 (or server 1010).

Then, the processor 870 may display the information 1110 on the display unit 840.

The information 1110 may include at least one of a first graphic object 1110a capable of selecting autonomous driving (or autonomous fueling) for allowing the vehicle to autonomously perform fueling within the gas station 1000 and a second graphic object 1110b capable of selecting manual driving (or manual fueling) for allowing the user to perform a driving (fueling) operation.

The processor 870 may enter an autonomous driving mode when the first graphic object 1110a is selected on the display unit 840.

In other words, the processor 870 may transmit the control of the vehicle 100 to the communication device 1020 (or server 1010) through the communication unit 810 when an autonomous driving mode is selected through the display unit 840.

Figure 11C:
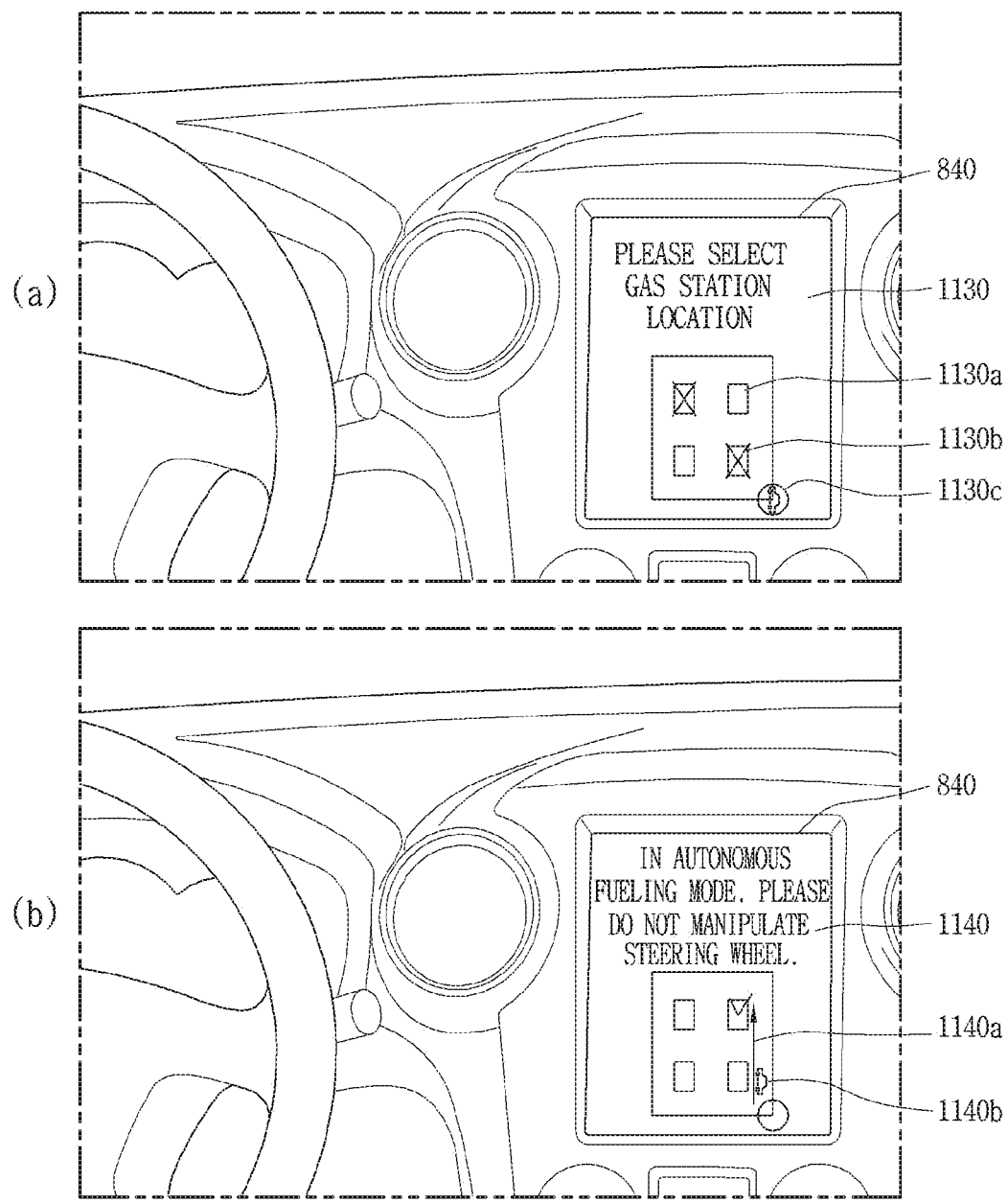

Furthermore, when an autonomous driving mode is selected through the display unit 840, the processor 870 may display either one of first screen information 1120 formed to a fueling amount or fueling cost as illustrated in FIG. 11B(b) and second screen information 1130 formed to select a fueling position within the gas station 1000 as illustrated in FIG. 11C(a) on the display unit 840.

Here, the first screen information 1120 and the second screen information 1130 may be selectively displayed on the display unit 840 according to a preset condition in the user's setting or a server associated with the gas station.

For example, when the relevant gas station 1000 is set to fill up a fuel, the first screen information 1120 may not be displayed.

For another example, when a fueling position in the gas station 1000 is set to be automatically determined by the server 1010, the second screen information 1130 may not be displayed on the display unit 840 existing in the vehicle.

In some implementations, the first screen information 1120 may include information 1120a associated with a current fuel of the vehicle 100 based on a maximum size of fuel tank of the relevant vehicle 100 and a currently remaining amount of fuel sensed through the sensing unit 830.

In some implementations, a unit price of fuel, a charging speed or the like provided from the relevant gas station 1000 may be displayed on the first screen information 1120 based on information received from the communication device 1020.

In some implementations, a user interface may be provided for a user to easily determine a fueling amount in the relevant gas station.

Additionally, the processor 870 may perform payment through the first screen information. When a fueling amount or fueling cost is selected through the first screen information 1120, the processor 870 may perform payment for a sum corresponding to the selected fueling amount or the selected fueling cost through prelinked payment method information.

The relevant payment method may be previously registered by the user for the vehicle in advance. For example, the payment method may include paying by a mobile terminal or paying by a card.

The processor 870 may transmit the mobile terminal information or card information to the server 1010 associated with the gas station or an external payment server to request payment, and receive payment approval information.

In some implementations, the processor 870 may transmit the control of the vehicle 100 to the communication device 1020 based on the completion of payment for the fueling amount or the fueling cost.

In other words, the foregoing description is to transmit the control of the vehicle to the communication device 1020 (or server 1010) when an autonomous driving mode is selected through the display unit 840, but in addition to this, the processor 870 may transmit the control of the vehicle 100 to the communication device 1020 (or server 1010) based on the selection of an autonomous driving mode and the completion of payment.

Furthermore, the second screen information 1130 may include map information associated with the gas station 1000 in which the vehicle 100 has entered based on information received from the communication device 1020.

The map information may include a graphic object 1130a indicating an available fuel dispenser, a graphic object 1130b indicating a non-available fuel dispenser and a graphic object 1130c indicating a current position of the vehicle in the relevant gas station 1000.

When any one of graphic objects 1130a indicating available fuel dispensers is selected from the second screen information 1130, the processor 870 may transmit information associated with the selected graphic object 1130a to the communication device 1020.

The server 1010 may select a fueling position (fuel dispenser) at which the relevant vehicle 100 injects a fuel based on information associated with the graphic object 1130a received from the communication device 1020.

In some implementations, when the second screen information 1130 is set not to be displayed, the communication device 1020 may determine a fueling position or a fuel dispenser at which the relevant vehicle 100 will inject a fuel according to a preset algorithm based on information of the current availability of the fuel dispensers within the gas station 1000.

Then, the processor 870 may transmit the control of the vehicle to the communication device 1020, and then allow the gas station 1000 to perform autonomous driving or autonomous fueling within the gas station 1000 based on a control command received from the communication device 1020 (or server 1010).

Figure 12:
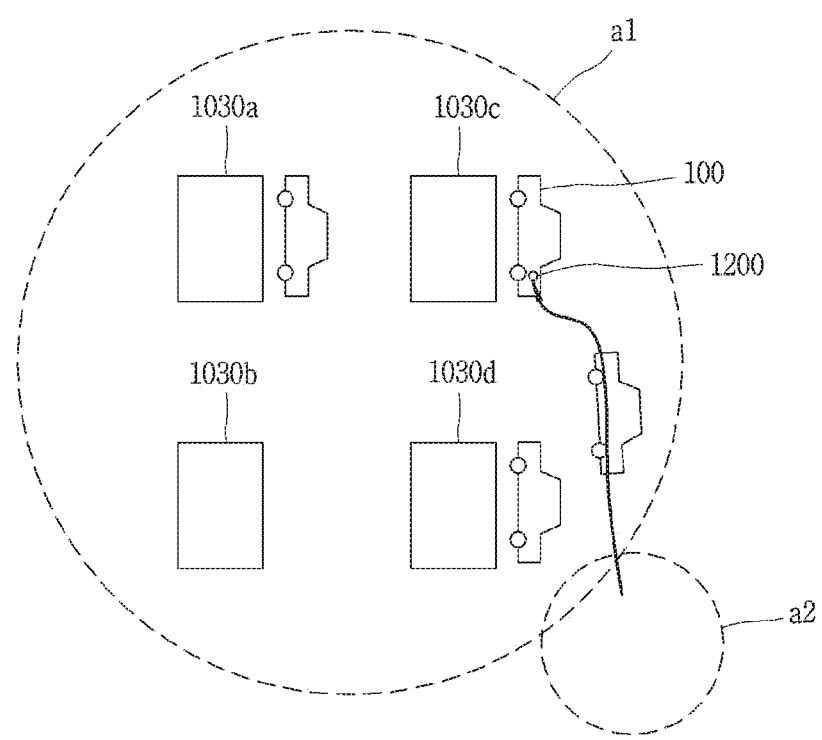

For example, as illustrated in FIG. 12, when a control command is received from the communication device 1020 subsequent to transmitting the control of the vehicle 100 to the communication device 1020 in a region (a2) that is communicable with the communication device 1020 in the gas station 1000, the processor 870 may allow the vehicle 100 to perform autonomous driving based on the control command.

Here, the control command may include steering information, speed information and the like for moving the vehicle to a fueling position selected from the second screen information 1130.

The processor 870 may move the vehicle 100 based on steering information, speed information and the like included in the control command.

The control command may be generated by the server 1010. In some implementations, a control command for allowing the vehicle 100 to perform autonomous driving or autonomous fueling within the gas station 1000 may be generated by the processor 870. The description thereof will be described later.

In some implementations, when the vehicle 100 starts autonomous driving as illustrated in FIG. 11C(b), the processor 870 may display information 1140 indicating a route 1140a for allowing the vehicle 100 to perform autonomous driving within the gas station 1000 on the display unit 840.

Furthermore, the information 1140 may also include a graphic object 1140b indicating a position at which the vehicle 100 is currently performing autonomous driving in the gas station 1000.

When the position of the vehicle 100 performing autonomous driving is moved, the processor 870 may also move and display the graphic object 1140b.

When the control of the vehicle 100 is received through the communication device 1020, the server 1010 may sense the surrounding information of the vehicle 100 and status information within the gas station 1000 (a position of an object within the gas station, a position of a fuel dispenser, etc.) using at least one of the camera and the sensing unit provided in the gas station 1000.

Then, the server 1010 may generate a control command for controlling the vehicle using the sensed information. Then, the server 1010 may transmit the generated control command to the vehicle control device 800 (or vehicle 100) through the communication device 1020.

The processor 870 may allow the vehicle to perform autonomous driving (or autonomous fueling) based on the transmitted control command.

Furthermore, as illustrated in FIG. 12, when the vehicle 100 arrives at a fueling position 1030c within the gas station, the processor 870 may open or close a fueling port provided in the vehicle 100 based on information received through the communication device 1020.

Specifically, when the vehicle arrives at a fueling position (fuel dispenser) corresponding to the graphic object 1130a indicating an available fuel dispenser selected from the second screen information 1130, the processor 870 may open a fueling port 1200 provided in the vehicle 100.

Then, when fueling is completed, the processor 870 may close the open fueling port 1200 of the vehicle 100 based on information (control command) received from the communication device 1020.

Figure 13:
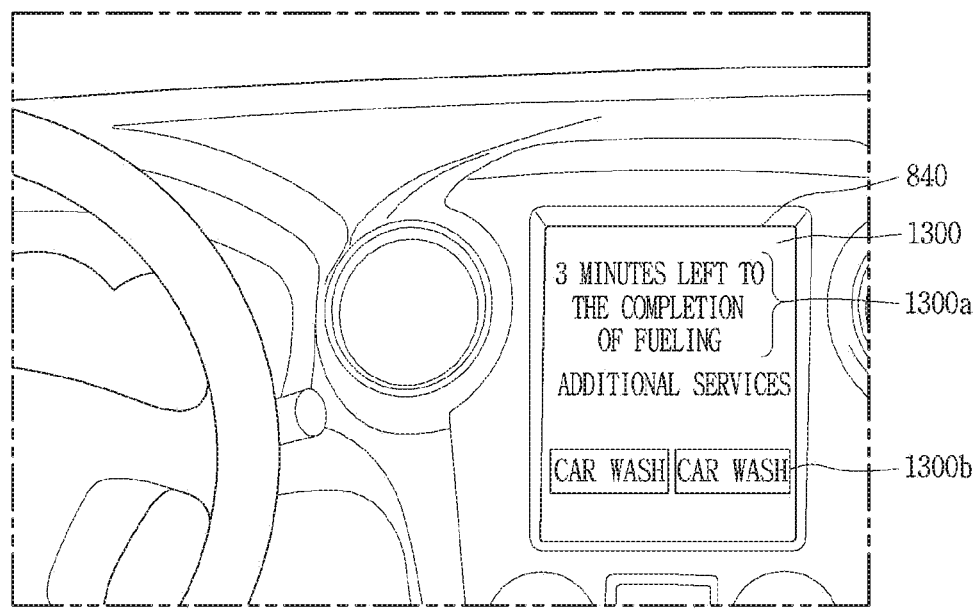
Figure 14:
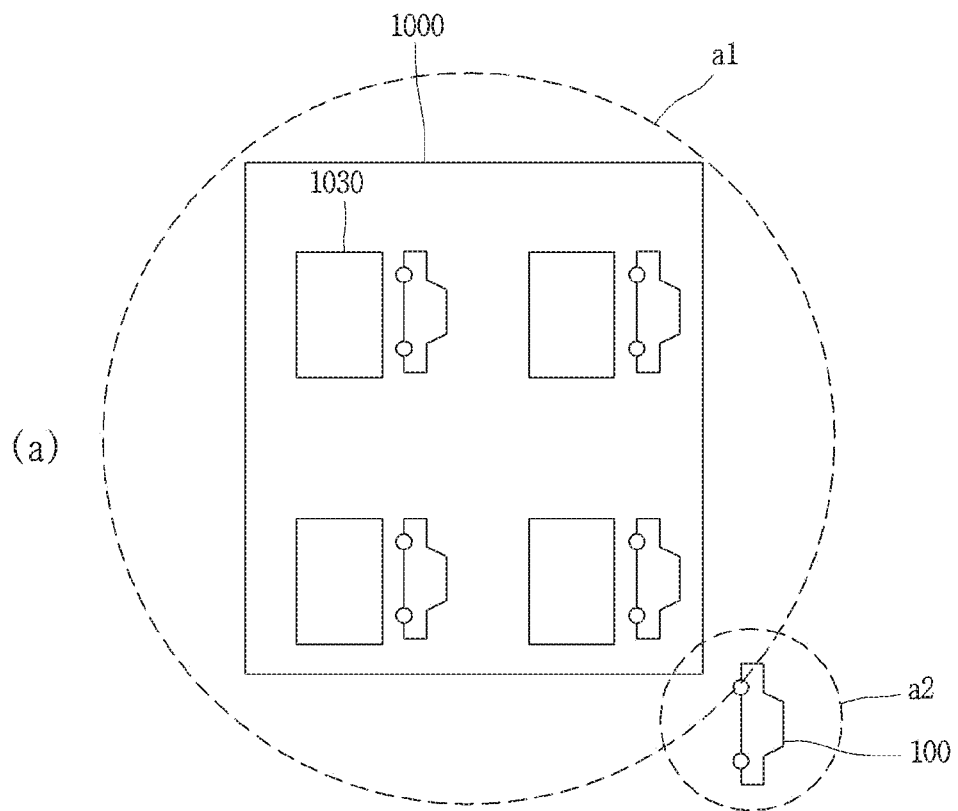
Figure 14:
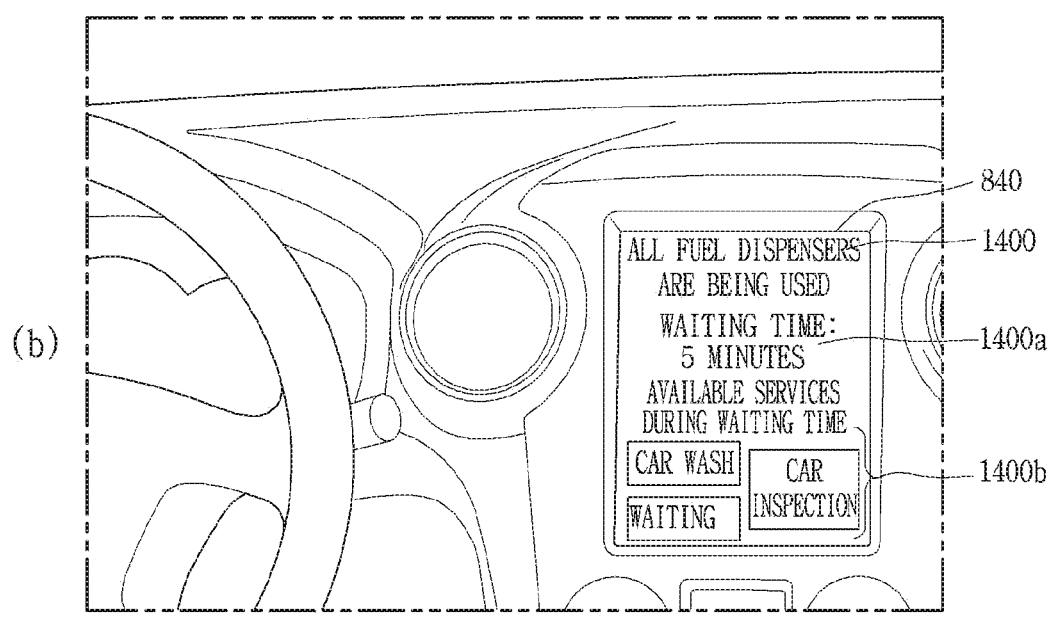
Figure 15:
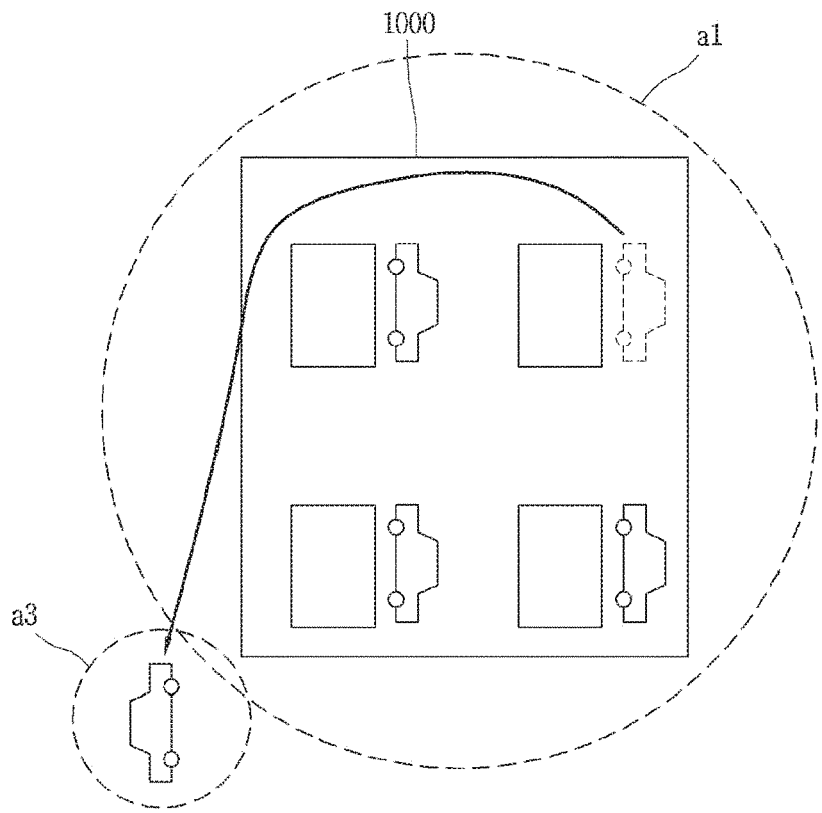
Figure 15:
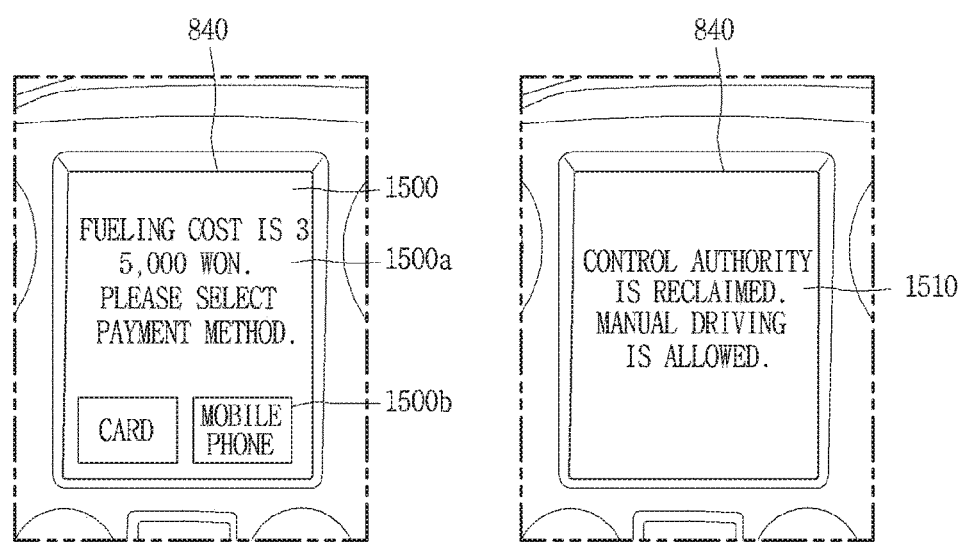

In some implementations, as illustrated in FIG. 13, the processor 870 may display screen information 1300 capable of selecting an available service during fueling based on information received from the communication device 1020 while the vehicle 100 performs the fueling.

Here, the screen information 1300 may include information 1300*a* for notifying a period of time required to complete fueling and a graphic object 1300*b* capable of selecting an available service.

In some implementations, when a fueling period of time to complete fueling is above a predetermined period of time, the screen information 1300 may be displayed on the display unit 840.

Specifically, the processor 870 may receive information associated with a period of time required to complete fueling from the server 1010 through the communication device 1020.

Then, when the period of time required to complete fueling is above a predetermined period of time (for example, 5 minutes), the processor 870 may display the screen information 1300 on the display unit 840.

When any one service is selected from the screen information 1300, the processor 870 may information associated with the selected service to the communication device 1020.

The server 1010 that has received information associated with the service through the communication device 1020 may generate a control command, and transmit the control command to the vehicle control device 800 (or vehicle 100) to perform the service.

The processor 870 that has received the control command may control the vehicle based on the control command.

For example, when the selected service is car wash, the processor 870 may perform autonomous driving and move the vehicle that has completed fueling to a car wash available place based on a control command received from the communication device 1020 (or server 1010).

For another example, when the selected service is car inspection, the processor 870 may move the vehicle 100 to a car inspection available place based on a control command received from the communication device 1020 (or server 1010).

Some implementations may include a system capable of conveniently receiving services associated with the vehicle as well as fueling.

In some implementations, when there is no fueling available space in the gas station 1000 as illustrated in FIG. 14A, the processor 870 may display screen information 1400 including at least one of a waiting time 1400*a* and an available service 1400*b* during the waiting time on the display unit 840 based on information received from the communication device 1020 as illustrated in FIG. 14B.

When there is no available fuel dispenser in the gas station 1000, the server 1010 may calculate time information for which the vehicle 100 that has entered the gas station should wait to start fueling based on the status of a currently fueling fuel dispenser and the position of the fuel dispenser, and transmit the calculated time information to the vehicle control device 800 (vehicle 100) through the communication device 1020.

Furthermore, the server 1010 may transmit information associated with services that can be provided to the vehicle 100 during the waiting time to the vehicle control device 800 (vehicle 100) through the communication device 1020.

The processor 870 may display screen information 1400 including at least one of information 1400*a* indicating a waiting time and a graphic object 1400*b* capable of selecting a service that can be carried out during the waiting time on the display unit 840 of the vehicle 100 based on the received time information and information associated with the service.

When there is no user input during the waiting time, the processor 870 may display either one of screen information illustrated in FIGS. 11B and 11C.

Then, when the fueling of the vehicle 100 is completed as illustrated in FIG. 15A, the processor 870 may move the vehicle 100 to one region (a3) of the gas station 1000 based on a control command received from the communication device 1020.

Here, the one region (a3) may be one region located near an exit within a communicable region between the communication device 1020 provided in the gas station and the vehicle control device 800.

When fueling for the vehicle 100 is completed, the server 1010 may generate a control command capable of moving the vehicle 100 to allow the vehicle to leave the gas station 1000, and transmit the generated control command to the vehicle control device 800 (vehicle 100) through the communication device 1020.

The processor 870 may perform autonomous driving to move the vehicle 100 to the one region (a3) based on the received control command.

When the vehicle 100 stops at the one region (a3), the processor 870 may receive the control of the vehicle 100 from the communication device 1020.

When the fueling of the vehicle is completed, the server 1010 may transmit the control of the vehicle to the vehicle 100 through the communication device 1020 to allow the manual driving of the vehicle 100.

Though it is described that the vehicle 100 is moved to one region (a3) of the gas station 1000 and then the control of the vehicle is transmitted to the vehicle control device 800 (vehicle 100), the present disclosure may not be necessarily limited to this. For example, the control of the vehicle may be transmitted to the vehicle control device 800 (vehicle 100) from the server 1010 based on the completion of the fueling of the vehicle.

In some implementations, when fueling is completed, screen information 1500 capable of performing payment may be displayed on the display unit 840 provided in the vehicle. The screen information 1500 may be displayed on the display unit 840 based on information received through the communication device 1020 from the server 1010.

The screen information 1500 may include least one of a payment amount 1500*a* and a graphic object upper cover plate 1500B capable of selecting a payment method as illustrated in FIG. 15B.

When payment required by the gas station is all completed, the control of the vehicle 100 may be transmitted from the communication device 1020 to the vehicle 100. In other words, FIG. 15B may be a view for explaining an example carried out after completion of the payment.

The server 1010 may transmit the control of the vehicle to the vehicle based on the completion of fueling and the completion of payment subsequent to moving the vehicle 100 to one region (a3).

When the control of the vehicle is reclaimed from the server 1010 to the vehicle 100 (vehicle control device 800), information 1510 (or information indicating that the manual control of the vehicle is allowed) for notifying that the control authority is reclaimed may be displayed on the display unit 840 of the vehicle as illustrated in FIG. 15C. In other words, when the control of the vehicle is received through the communication device 1020, the processor 870 may display the information 1510 on the display unit 840.

When the control of the vehicle 100 is received as illustrated in FIG. 15C, the processor 870 may display screen information 1510 for notifying that the manual driving of the vehicle 100 is allowed on the display unit 840.

Furthermore, the processor 870 may control the vehicle 100 based on the user's driving operation received subsequent to displaying the screen information 1510 on the display unit 840 (namely, subsequent to receiving the control of the vehicle).

The vehicle 100 may perform manual driving by the user's driving operation.

In some implementations, the vehicle 100 is able to perform autonomous driving or autonomous fueling based on a control command generated from the server 1010 of the gas station as well as able to perform autonomous driving or autonomous fueling based on a control command generated based on at least one of the camera 820 and sensing unit 830 included in the vehicle control device 800.

In other words, the processor 870 of the vehicle control device 800 may generate a first control command for allowing the vehicle 100 to perform autonomous driving or autonomous fueling within the gas station 1000 using at least one of the camera 820 and sensing unit 830 provided in the vehicle control device 800.

Furthermore, the processor 870 may receive a second control command generated from the server 1010 associated with the gas station through the communication device 1020. The second control command may be a control command generated from the server 1010 to allow the vehicle 100 to perform autonomous driving or autonomous fueling based on at least one of the camera and sensing unit provided in the gas station 1000.

When the second control command generated from the server 1010 through the communication device 1020 is received, the processor 870 may allow the vehicle 100 to perform autonomous driving within the gas station 1000 using at least one of the first and the second control command.

The first and the second control command may have different generated positions from each other, and different information (for example, image and sensing data) used to generate the control commands, and thus may be formed to perform different vehicle controls for a predetermined section.

For example, the processor 870 may allow the vehicle 100 to perform autonomous driving based on the second control command (namely, a control command generated from the server 1010 associated with the gas station) received from the communication device 1020. It is because the control of the vehicle has been transmitted to the server.

In some implementations, when vehicle control according to the first control command and vehicle control according to the second control command are different from each other, the processor 870 may control the vehicle 100 based on the first control command.

For example, an object that is not captured in an image received from the camera of the gas station may be captured in an image received from the camera 820 of the vehicle control device. In this case, vehicle control according to the first control command and vehicle control according to the second control command may be carried out at different time points from each other.

In this case, the processor 870 may perform vehicle control according to the first control command to allow the vehicle to perform autonomous driving within the gas station.

Then, when vehicle control according to the first control command and vehicle control according to the second control command are identical to each other, the processor 870 may control the vehicle based on the second control command.

Through the foregoing configuration, the present disclosure may provide a control method capable of allowing the vehicle to more safely perform autonomous driving within the gas station.

In some implementations, the processor 870 associated with the present disclosure may display all screen information, for example, at least one of reference numerals 1110, 1120, 1130, 1140, 1300, 1400, 1500, and 1510. displayed on the display unit 840 provided in the vehicle on the touch screen of the mobile terminal. The processor 870 may transmit all screen information that can be displayed on the display unit 840 disclosed herein to the mobile terminal through the communication unit 810 to display the all screen information on the touch screen of the mobile terminal.

Here, the mobile terminal may be a mobile terminal that is communicable with (or communicably connected to or authenticated for) the vehicle 100 or vehicle control device 800 associated with the present disclosure. For example, it may be the vehicle owner's mobile terminal.

In some implementations, when the driver gets in the vehicle 100, the processor 870 may display screen information on the display unit 840 of the vehicle, and display the screen information on the mobile terminal when the driver exists out of the vehicle 100.

When it is sensed that the driver gets out of the vehicle through the sensing unit 830 in a state that screen information received from the server (or communication device) is displayed on the display unit 840 as the driver is getting in the vehicle, the processor 870 may display screen information being displayed on the display unit 840 on the touch screen of the driver's mobile terminal.

In this case, the display of the screen information may be maintained or disappear on the display unit 840. For example, the display of the screen information may be maintained when another passenger other than the driver is getting in the vehicle 100. For another example, when the screen information disappears, the display unit 840 may display another screen information or enter an inactive or off state.

Furthermore, when the screen information 1120 formed to select a fueling amount or fueling cost illustrated in FIG. 11B(b) is displayed on the touch screen of the mobile terminal and payment is completed through the touch screen of the mobile terminal, at least one of fuel amount information currently provided in the vehicle, fueling amount (charged fuel amount) information according to the payment cost may be further displayed on the touch screen.

The foregoing information may be displayed on at least one of the display unit 840 and the mobile terminal when payment is completed through the display unit 840.

In some implementations, when the vehicle 100 is in an autonomous driving mode when approaching the gas station or the driver is not in the vehicle subsequent to entering the gas station, the processor 870 may atomically enter an autonomous driving mode.

For example, when a fuel amount is less than a predetermined amount in a state that the vehicle 100 is in an autonomous driving mode, the processor 870 may select any one gas station based on the current position of the vehicle (or based on the user's selection), and allow the vehicle to perform autonomous driving to the selected gas station.

Then, when the vehicle 100 enters the gas station with autonomous driving, the processor 870 may immediately enter an autonomous driving mode without any selection of an additional driving mode within the gas station.

Furthermore, when the vehicle 100 enters the gas station 1000 and the user gets out of the vehicle 100 without any additional selection, the processor 870 may automatically enter an autonomous driving mode.

Specifically, when the vehicle enters in an autonomous driving mode or the driver gets out of the vehicle subsequent to entering the gas station, the processor 870 may immediately enter an autonomous driving mode without displaying screen information 1110 illustrated in FIG. 11B(a) (namely, without the user's selection through the display unit 840 (or mobile terminal)).

For example, when the gas station is a gas station provided with a constituent element such as a server and a communication device capable of allowing the vehicle 100 to perform autonomous driving, the processor 870 may automatically enter an autonomous driving mode.

When the vehicle 100 enters an autonomous driving mode without selecting a driving mode within the gas station through the display unit 840 (or mobile terminal) screen information 1110 illustrated in FIG. 11B(a) may not be displayed on the display unit 840 of the vehicle or the touch screen of the mobile terminal.

Furthermore, the fueling amount or fueling cost may be selected as a fueling amount or fueling cost preset in the vehicle 100 (or vehicle control device 800) or selected through the mobile terminal.

For example, when the vehicle automatically enters an autonomous driving mode, the processor 870 may display at least one of screen information 1120 formed to select a fueling amount or fueling cost and screen information 1130 formed to select a fueling position on the mobile terminal or the display unit 840.

Furthermore, when the vehicle automatically enters an autonomous driving mode, the processor 870 may display screen information disclosed herein on at least one of the display unit 840 and the mobile terminal.

When the vehicle automatically enters an autonomous driving mode as the driver gets out of the vehicle 100, the processor 870 may display information indicating that the vehicle is currently in an autonomous fueling state or information capable of switching to a manual driving mode on the display unit 840 (or mobile terminal) if the driver gets in the vehicle 100.

The information capable of switching to a manual driving mode may be displayed on the display unit 840 or on the mobile terminal when fueling is completed or the vehicle is located in a specific region (a3) or when payment is completed in the specific region (a3), for instance.

In some implementations, the vehicle control device 800 may be included in the vehicle 100. The operation or control method of the vehicle control device 800 may be analogically applicable to the operation or control method of the vehicle 100 (or controller 170) in the same or similar manner.

For example, the control method of the vehicle 100 or control method of the vehicle control device 800 may include being connected to a communication device existing in a gas station to enable communication, and controlling a vehicle to perform an operation linked to information based on the information received from the communication device.

The control method of the vehicle 100 or control method of the vehicle control device 800 may further include displaying information for inquiring whether or not to perform autonomous driving within the gas station on a display unit of the vehicle when the vehicle enters a region communicable with the communication device, and transmitting the control of the vehicle to the communication device when an autonomous driving mode is selected through the display unit, and allowing the vehicle to perform autonomous driving within the gas station based on a control command received from the communication device.

The process described above may be carried out by the controller 170 provided in the vehicle 100 as well as by the vehicle control device 800.

The functions, configurations, or control method executed by the vehicle control device 800 may be executed by the controller 170 provided in the vehicle 100. In other words, the control method disclosed herein may be applicable to the vehicle or to the control device.

In some implementations, the control method may be delivered as software codes recorded on a computer-readable medium. The computer-readable media may include all kinds of recording devices in which data readable by a computer system is stored such as ROM, RAM, CD-ROM, magnetic tape, floppy disk, optical data storage device, and the like. In some implementations, the control method software may be transmitted by a carrier wave, for example, transmission via the Internet. In addition, the computer may include a processor or controller. Accordingly, the detailed description thereof should not be construed as restrictive in all aspects but considered as illustrative. The scope of the disclosure should be determined by reasonable interpretation of the appended claims and all changes that come within the equivalent scope of the disclosure are included in the scope of the disclosure.

What is claimed is:

1. A vehicle control device for a vehicle, comprising:
   a communication unit configured to communicate with a communication device located at a gas station; and
   a processor configured to control the vehicle to perform autonomous driving and autonomous fueling based on information received from the communication device,
   wherein the processor is further configured to:
      transmit control of the vehicle to the communication device based on the vehicle entering into a region communicable with the communication device,
      drive the vehicle to one region of the gas station based on a control command received from the communication device when the autonomous fueling of the vehicle is completed, and
      receive the control of the vehicle from the communication device based on a completion of a required payment for the gas station in a state in which the vehicle is stopped at the one region of the gas station.

2. The vehicle control device of claim 1, further comprising:
   a display unit,
   wherein the processor is configured to, based on the vehicle entering a region communicable with the communication device, receive information from the communication device and transmit the received information to the display unit, the information being an inquiry on whether or not to perform autonomous driving within the gas station.

3. The vehicle control device of claim 2, wherein the processor is configured to transmit a control signal for operating the vehicle to the communication device based on an autonomous driving mode being selected through the display unit.

4. The vehicle control device of claim 3, wherein the processor is configured to transmit one of a first screen information for selecting a fueling amount or a fueling cost or a second screen information for selecting a fueling position within the gas station that is displayed on the display unit based on an autonomous fueling mode being selected through the display unit.

5. The vehicle control device of claim 4, wherein the processor is configured to transmit the control signal for operating the vehicle to the communication device based on a completion of payment for the selected fueling amount or the fueling cost.

6. The vehicle control device of claim 3, wherein the processor is configured to allow the vehicle to perform autonomous driving within the gas station based on a control command received from the communication device.

7. The vehicle control device of claim 6, wherein the processor is configured to, based on the vehicle starting autonomous driving, cause to be displayed on the display unit a route information that the vehicle will follow during autonomous driving within the gas station.

8. The vehicle control device of claim 1, wherein the processor is configured to, based on the vehicle arriving at a fueling position within the gas station, control the vehicle to open or close a fueling port of the vehicle according to information received from the communication device.

9. The vehicle control device of claim 1, wherein the processor is configured to cause to be displayed on the display unit a screen information of a service that can be selected via a display unit and carried out during fueling according to information received from the communication device.

10. The vehicle control device of claim 9, wherein the screen information is displayed on the display unit based on a fueling time exceeding a predetermined period of time for a completion of fueling.

11. The vehicle control device of claim 1, wherein the processor is configured to, based on no fueling space being available in the gas station, cause to be displayed on the display unit a screen information of at least one of a waiting time or an available service during the waiting according to information received from the communication device.

12. The vehicle control device of claim 1, wherein the processor is configured to, based on the control signal being received, (i) cause to be displayed on the display unit a screen information indicating that a manual operation of the vehicle is allowed and (ii) control the vehicle according to a user's driving operation.

13. The vehicle control device of claim 1, further comprising:
at least one of a camera or a sensing unit,
wherein the processor is configured to generate a first control command that allows the vehicle to perform autonomous driving within the gas station based on information received from at least one of the camera or the sensing unit,
wherein a server associated with the gas station is configured to generate a second control command that is communicated through the communication device, and
wherein the processor is configured to allow the vehicle to perform autonomous driving based on at least one of the first control command or the second control command.

14. The vehicle control device of claim 13, wherein the processor is configured to (i) allow the vehicle to perform autonomous fueling based on the second control command received from the communication device and (ii) control the vehicle according to the first control command based on the first control command being different from the second control command.

15. A vehicle comprising the vehicle control device according to claim 1.

16. The vehicle control device of claim 1, wherein the communication unit is located at the vehicle.

17. A control method for controlling a vehicle, the control method comprising:
communicating with a communication device located at a gas station;
controlling a vehicle to perform an operation based on information received from the communication device;
transmitting control of the vehicle to the communication device based on the vehicle entering into a region communicable with the communication device;
driving the vehicle to one region of the gas station based on a control command received from the communication device when fueling of the vehicle is completed; and
receiving the control of the vehicle from the communication device based on a completion of a required payment for the gas station in a state in which the vehicle is stopped in the one region of the gas station.

18. The control method of claim 17, wherein transmitting the control of the vehicle to the communication device comprises:
displaying an information on a display unit of the vehicle, the information being an inquiry of whether or not to perform autonomous driving within the gas station based on the vehicle entering a region communicable with the communication device;
transmitting a control signal for operating the vehicle to the communication device based on an autonomous driving mode being selected through the display unit; and
allowing the vehicle to perform autonomous driving within the gas station based on a control command received from the communication device.

19. The control method of claim 17, wherein communicating with the communication device comprises communicating between a communication unit located at the vehicle and the communication device located at the gas station.

* * * * *